US011562590B2

(12) United States Patent
Valouch

(10) Patent No.: US 11,562,590 B2
(45) Date of Patent: Jan. 24, 2023

(54) REAL-TIME DATA ITEM PREDICTION

(71) Applicant: SAP SE, Walldorf (DE)

(72) Inventor: Vladimir Valouch, Olomouc (CZ)

(73) Assignee: SAP SE, Walldorf (DE)

( * ) Notice: Subject to any disclaimer, the term of this patent is extended or adjusted under 35 U.S.C. 154(b) by 265 days.

(21) Appl. No.: 16/880,616

(22) Filed: May 21, 2020

(65) Prior Publication Data

US 2021/0365676 A1 Nov. 25, 2021

(51) Int. Cl.
*G06V 30/413* (2022.01)
*G06N 20/00* (2019.01)
*G06V 20/62* (2022.01)

(52) U.S. Cl.
CPC .......... *G06V 30/413* (2022.01); *G06N 20/00* (2019.01); *G06V 20/62* (2022.01)

(58) Field of Classification Search
CPC ...... G06K 9/00456; G06K 9/325; G06K 9/00; G06K 9/32
See application file for complete search history.

(56) References Cited

U.S. PATENT DOCUMENTS

| 8,095,530 | B1 | 1/2012 | Lloyd |
| 8,953,885 | B1 | 2/2015 | Och et al. |
| 10,417,788 | B2 | 9/2019 | Risman et al. |
| 10,650,230 | B2 | 5/2020 | Johnson |
| 2007/0065003 | A1 | 3/2007 | Kellerman et al. |
| 2011/0211759 | A1 | 9/2011 | Park et al. |
| 2014/0023273 | A1 | 1/2014 | Baheti et al. |
| 2014/0079297 | A1* | 3/2014 | Tadayon ............... G06V 40/172 382/118 |
| 2015/0339525 | A1 | 11/2015 | Marcelli et al. |
| 2017/0109573 | A1* | 4/2017 | Collet ................. G06V 30/2504 |
| 2018/0025256 | A1 | 1/2018 | Bai et al. |
| 2019/0130213 | A1 | 5/2019 | Shazeer et al. |
| 2019/0130578 | A1 | 5/2019 | Gulsun et al. |
| 2019/0147304 | A1 | 5/2019 | Liu et al. |
| 2019/0266474 | A1 | 8/2019 | Stark et al. |
| 2019/0279035 | A1 | 9/2019 | Bluche |
| 2019/0385001 | A1 | 12/2019 | Stark |
| 2020/0042591 | A1 | 2/2020 | Aguiar et al. |

(Continued)

OTHER PUBLICATIONS

Dzmitry Bahdanau et al, "Neural Machine Translation by Jointly Learning to Align and Translate," in ICLR 2015, May 19, 2016, 12 pages.

(Continued)

*Primary Examiner* — David Bilodeau
(74) *Attorney, Agent, or Firm* — Fountainhead Law Group P.C.

(57) ABSTRACT

Some embodiments provide a method that predicts data items from a real-world object in real-time. The method captures a video comprising a plurality of frames. The method further performs object detection on a frame in the plurality of frames to determine that the frame includes an object. The method also processes the frame using a plurality of models, wherein each model in the plurality of models is configured to predict a set of candidate data items associated with the object. The method selects one or more candidate data items from the sets of candidate data items associated with the object as a set of data items. The method populates a record with the set of data items.

20 Claims, 18 Drawing Sheets

(56) References Cited

U.S. PATENT DOCUMENTS

2020/0219043 A1* 7/2020 Talbot ............... G06N 20/00
2020/0226407 A1* 7/2020 Kendrick ........... G06V 20/653
2020/0273013 A1* 8/2020 Garner .............. G06Q 10/087

OTHER PUBLICATIONS

Ilya Sutskever et al, "Sequence to Sequence Learning with Neural Networks," Dec. 14, 2014, 9 pages.
Jiang Wang et al, "CNN-RNN: A Unified Framework for Multi-label Image Classification," Cornell University Library, Apr. 15, 2016, 10 pages.
Yuntian Deng Et , "Image-to-Markup Generation with Coarse-to-Fine Attention," Proceedings of the 34th International Conference on Machine Learning, Jun. 13, 2017, Sydney, Australia, 10 pages.
Andrej Karpathy et al.,Deep Visual-Semantic Alignments for Generating Image Descriptions,CVPR 2015 Conference, Jun. 8-12, 2015, 17 pages.
Yann Lecun et al., "Convolutional Networks for Images, Speech, and Time-Series," Handbook of Brain Theory and Neural Networks. MIT Press, published Jun. 1995, 14 pages.

* cited by examiner

FIG. 12

REAL-TIME DATA ITEM PREDICTION

BACKGROUND

The proliferation of cameras and other electronic image capture devices has led to massive growth in the availability of images. For example, cameras can be found on almost all mobile devices, and such ready access to a camera allows users to capture an ever increasing number of electronic images. Interestingly, images often contain data, and such data can be useful for a wide range of applications. However, extracting data from an image is no simple task. For example, an image of a receipt may include data about the particular expenses. However, accurately extracting such data from the image is challenging. Accordingly, it would be advantageous to discover efficient and effective techniques for extracting data from electronic images.

SUMMARY

In some embodiments, a method includes capturing, by an image capture device, a video comprising a plurality of frames. The method also includes performing, by an object detector, object detection on a frame in the plurality of frames to determine that the frame includes an object. The method further includes processing the frame using a plurality of models, wherein each model in the plurality of models is configured to predict a set of candidate data items associated with the object. The method also includes selecting one or more candidate data items from the sets of candidate data items associated with the object as a set of data items. The method moreover populates a record with the set of data items.

In some embodiments, a first model in the plurality of models is configured to predict characters from images and a second model in the plurality of models is configured to predict characters from machine generated text.

In some embodiments, processing the frame may include processing the frame using the first model to predict a first candidate data item from a first text data item in the object. Processing the frame may include processing the frame using an optical character recognition (OCR) machine learning model to generate text. Processing the frame may also include processing the generated text using the second model to predict a second candidate data item from the first text data item in the object. In these embodiments, selecting includes selecting the first candidate data item or the second candidate data item as a first data item in the set of data items corresponding to the first text data item.

In some embodiments, processing the frame further includes communicating at least a portion of the generated text to a computing device configured to process the portion of the generated text using a third model, the third model configured to predict characters from OCR-generated text. Processing the frame may include receiving, from the server, a third candidate data item predicted from the first text data item according to the third model. In these embodiments, selecting further includes selecting the first candidate data item, the second candidate data item, or the third candidate data item as the first data item corresponding to the first text data item.

In some embodiments, the first model generates a first confidence score associated with the first candidate data item, the second model generates a second confidence score associated with the second candidate data item, and the third model generates a third confidence score associated with the third candidate data item. In these embodiments, selecting the first candidate data item, the second candidate data item, or the third candidate data item further includes selecting the first candidate data item, the second candidate data item, or the third candidate data item based on which of the first confidence score, the second confidence score, and the third confidence score is highest.

In some embodiments, processing the frame further includes processing the frame using the first model to predict a fourth candidate data item from a second text data item in the object. Processing the frame may also include processing the generated text using the second model to predict a fifth candidate data item from the second text data item. In these embodiments, selecting further includes selecting the fourth candidate data item or the fifth candidate data item as a second data item in the set of data items corresponding to the second text data item.

In some embodiments, the object is a first object and the frame is a first frame. In these embodiments, the method may further include performing, by the object detector, object detection on a second frame in the plurality of frames to determine that the second frame includes a second object. The method may also include processing the second frame using the plurality of models to predict sets of candidate data items associated with the second object. The method moreover includes determining if a subset of the sets of candidate data items associated with the second object is similar to a subset of the sets of candidate data items associated with the first object.

In some embodiments, if the subset of the sets of candidate data items associated with the second object is similar to the subset of the sets of candidate data items associated with the first object, selecting may further include selecting one or more candidate data items from the sets of candidate data items associated with the first object and the subset of the sets of candidate data items associated with the second object as the set of data items.

In some embodiments, if the subset of the sets of candidate data items associated with the second object is not similar to the subset of the sets of candidate data items associated with the first object, selecting further includes selecting one or more candidate data items from the sets of candidate data items associated with the second object as an additional set of data items. In these embodiments, the method further includes populating the record with the additional set of data items.

In some embodiments, determining if the subset of the sets of candidate data items associated with the second object is similar to the subset of the sets of candidate data items associated with the first object includes converting the subset of the sets of candidate data items associated with the first object into first vector representations and converting the subset of the sets of candidate data items associated with the second object into second vector representations. In these embodiments, the method may include performing cosine similarity on the first vector representations and the second vector representations.

In other embodiments, a non-transitory machine-readable medium storing a program executable by at least one processing unit of a device is provided. The program may include instructions for capturing, by an image capture device, a video comprising a plurality of frames. The program also includes instructions for performing, by an object detector, object detection on a frame in the plurality of frames to determine that the frame includes an object. Moreover, the program includes instructions for processing the frame using a plurality of models with each model in the plurality of models configured to predict a set of candidate data items associated with the object. The program also includes instructions for selecting one or more candidate data items from the sets of candidate data items associated with the object as a set of data items. The program additionally includes instructions for populating a record with the set of data items.

In some embodiments, a first model in the plurality of models is configured to predict characters from images and a second model in the plurality of models is configured to predict characters from machine generated text.

In some embodiments, processing the frame includes processing the frame using the first model to predict a first candidate data item from a first text data item in the object, processing the frame using an optical character recognition (OCR) machine learning model to generate text, and processing the generated text using the second model to predict a second candidate data item from the first text data item in the object. In these embodiments, selecting further includes selecting the first candidate data item or the second candidate data item as a first data item in the set of data items corresponding to the first text data item.

In some embodiments, processing the frame includes communicating at least a portion of the generated text to a computing device configured to process the portion of the generated text using a third model, the third model configured to predict characters from OCR-generated text. Processing the frame may further include receiving, from the computing device, a third candidate data item predicted from the first text data item according to the third model. In these embodiments, selecting further includes selecting the first candidate data item, the second candidate data item, or the third candidate data item as the first data item corresponding to the first text data item.

In some embodiments, the object is a first object and the frame is a first frame. In these embodiments, the program may further include instructions for performing, by the object detector, object detection on a second frame in the plurality of frames to determine that the second frame includes a second object. The program may further include instructions for processing the second frame using the plurality of models to predict sets of candidate data items associated with the second object, and determining if a subset of the sets of candidate data items associated with the second object is similar to a subset of the sets of candidate data items associated with the first object.

In further embodiments, a system is provided. The system may include a set of processing units and a non-transitory machine-readable medium storing a program. The program may include instructions for capturing, by an image capture device, a video comprising a plurality of frames and performing, by an object detector, object detection on a frame in the plurality of frames to determine that the frame includes an object. The program may also include instructions for processing the frame using a plurality of models, where each model in the plurality of models is configured to predict a set of candidate data items associated with the object. The program may also include instructions for selecting one or more candidate data items from the sets of candidate data items associated with the object as a set of data items. The program may additionally include instructions for populating a record with the set of data items.

In some embodiments, a first model in the plurality of models is configured to predict characters from images and a second model in the plurality of models is configured to predict characters from machine generated text.

In some embodiments, processing the frame includes processing the frame using the first model to predict a first candidate data item from a first text data item in the object, processing the frame using an optical character recognition (OCR) machine learning model to generate text, and processing the generated text using the second model to predict a second candidate data item from the first text data item in the object. In these embodiments, selecting may include selecting the first candidate data item or the second candidate data item as a first data item in the set of data items corresponding to the first text data item.

In some embodiments, the object is a first object and the frame is a first frame. In these embodiments, the program may further include instructions for performing, by the object detector, object detection on a second frame in the plurality of video frames to determine that the second frame includes a second object, processing the second frame using the plurality of models to predict sets of candidate data items associated with the second object, and determining if a subset of the sets of candidate data items associated with the second object is similar to a subset of the sets of candidate data items associated with the first object. In these embodiments, if the subset of the sets of candidate data items associated with the second object is similar to the subset of the sets of candidate data items associated with the first object, selecting further includes selecting one or more candidate data items from the sets of candidate data items associated with the first object and the subset of the sets of candidate data items associated with the second object as the set of data items. In these embodiments, if the subset of the sets of candidate data items associated with the second object is not similar to the subset of the sets of candidate data items associated with the first object, selecting further includes selecting one or more candidate data items from the sets of candidate data items associated with the second object as an additional set of data items and populating the record with the additional set of data items.

The following detailed description and accompanying drawings provide a better understanding of the nature and advantages of various embodiments of the present disclosure.

BRIEF DESCRIPTION OF THE DRAWINGS

FIG. 12 shows a user interface and certain exemplary features, according to one embodiment.

DETAILED DESCRIPTION

Figure 1:
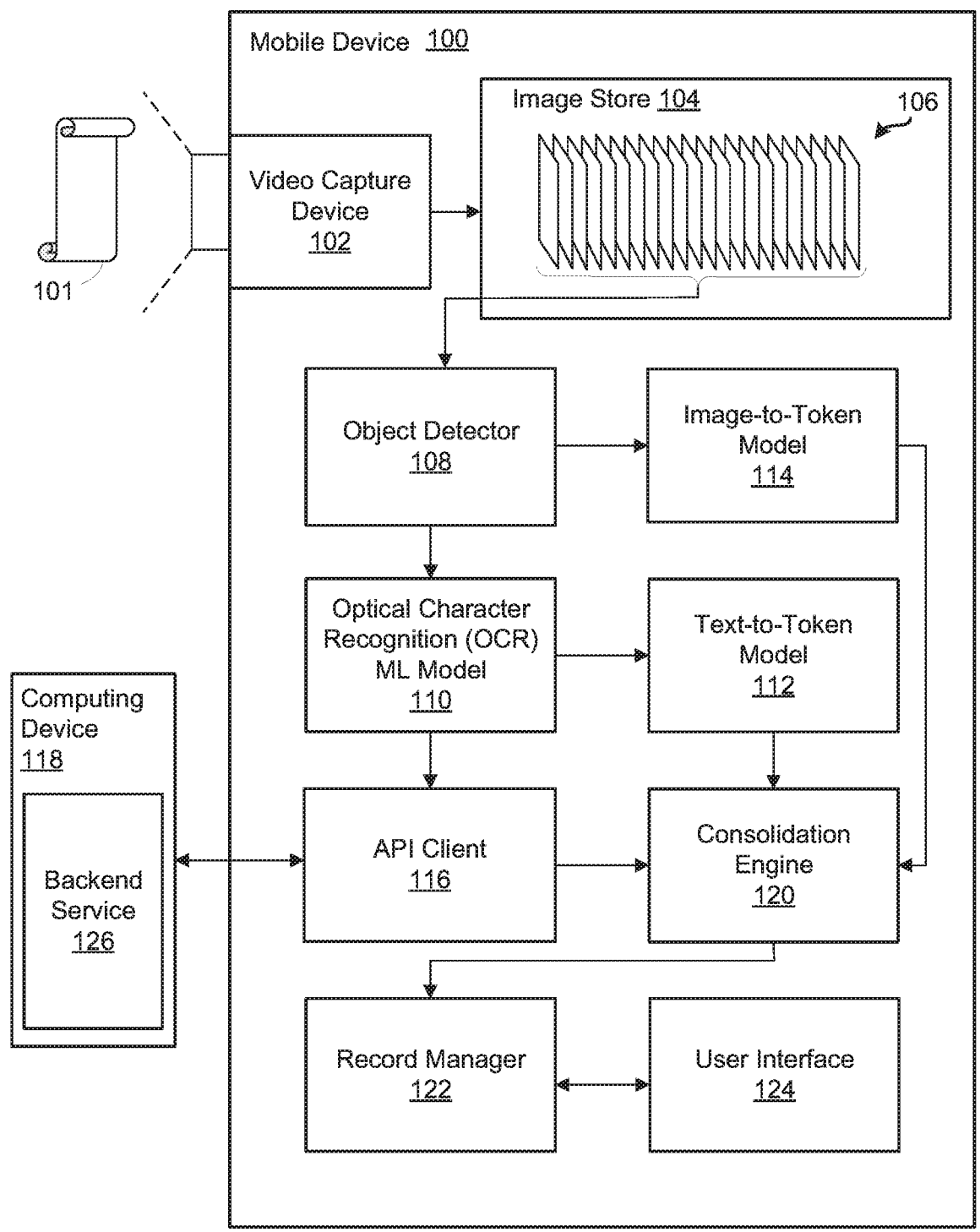
FIG. 1 illustrates a mobile device for predicting a set of data items from an object according to some embodiments.

In the following description, for purposes of explanation, numerous examples and specific details are set forth in order to provide a thorough understanding of the present disclosure. It will be evident, however, to one skilled in the art that various embodiment of the present disclosure as defined by the claims may include some or all of the features in these examples alone or in combination with other features described below, and may further include modifications and equivalents of the features and concepts described herein.

Described herein are techniques for predicting text from real-world objects in real-time. In some embodiments, a computing device such as a mobile device may capture a video of a real-world environment. The real-world environment may include an object with text data items on the object. The text data items may be machine-generated (e.g., printed or displayed) or handwritten. The object itself may be any object capable of displaying text, such as a receipt, a hotel folio, and a transportation ticket, among others. If the object is a receipt or hotel folio, it may contain multiple line items pertaining to expenses.

The computing device performs object detection on video frames of the captured video to detect that an object is present in the video frames. Generally, object detection refers to processes that detect whether an image includes an object of interest. When an object is present, the computing device processes the video frame to generate text from the text data items. Next, the computing device processes the video frame and the generated text using multiple machine learning models to predict candidate data items from the text data items present in the object.

A candidate data item may refer to a set of information related to a line item expense. For example, for a give line item, the group of information may include a descriptor that describes the expense and various attributes of the expense. The descriptor may be a name of the expense (e.g. "coffee," "room charge," etc.). The attributes may include an amount, a currency, a date, a vendor, and an expense type, among others that are attributable to that expense.

The machine learning models may predict the set of information related to a line item expense, including the descriptor and the various attributes. Each of the models may provide confidence scores associated with each prediction. The computing device next consolidates the candidate data items obtained from the models and from multiple video frames into priority queues. For example, the computing device may place matching line items that are predicted from the models and the video frames into the same priority queue.

Next, the computing device may select from each priority queue candidate data items as the set of data items to populate a record with. For example, the computing device may select a predicted line item with the highest confidence score associated with the amount attribute as the line item to populate the record with. In certain embodiments, the record may be an expense report. The computing device may then provide the set of data items for display on a user interface. In so doing, a user may confirm the accuracy of the set of data items and assign the set of data items to a desired record.

The techniques described in the present application provide a number of benefits and advantages over conventional methods of predicting data items from text data items contained in real-world objects. For instance, by capturing the object in a video and not a single photo image, the computing device may process a plurality of frames to predict data items from the object. As a result, the computing device is given more opportunities to obtain correct results from the object. Moreover, by processing video frames rather than photo images (e.g., still images), the computing device may provide results with greater speed and efficiency. For example, video frames may be smaller-sized files as compared to photo images and therefore be processed with greater speed. Additionally, the computing device may be capable of predicting data items from multiple objects (or multiple pages of the same object) in one video rather than requiring the user to take a photo image of each object individually. This results in greater ease of use for the end user. Further still, by using a plurality of models for predicting candidate data items from the object and subsequently selecting the best candidate data items, the accuracy and completeness of the final result is thereby improved. For example, some embodiments employ models that have been trained in recognizing different types or sources of text data (e.g., printed versus handwritten). As a result, the computing device is capable of accurately predicting data items from differing types of text data.

As mentioned above, the techniques described here are used to predict a set of data items from real-world objects in real-time. There are many applications to which the techniques may be applied. For example, the computing device may be a mobile device that predicts line item information from text data contained on expense-related documents such as receipts, hotel folios, and transportation tickets, among others. Each expense-related document may include one or more line items. Each line item can include a number of different fields or attributes such as, for example, an amount, a date, a currency, a vendor name, a location, and an expense type, among others. The techniques described here can be applied to predicting line item information from expense-related documents. The line item information may then be populated and grouped with other line item information in an expense report. Further, the techniques described here allow a user of the computing device to verify the accuracy of the predicted line items and to assign them to desired expense reports for reporting, for example.

FIG. 1 illustrates a mobile device 100 for predicting a set of data items from objects in the real-world. As shown, mobile device 100 includes video capture device 102, image store 104, object detector 108, optical character recognition (OCR) machine learning (ML) model 110 ("OCR ML model"), text-to-token model 112, image-to-token model 114, application programming interface (API) client 116, consolidation engine 120, record manager 122, and user interface 124. Also shown in FIG. 1 are object 101 and computing device 118. Mobile device 100 may be any type of mobile computing device, including but not limited to a mobile phone, a personal digital assistant (PDA), a laptop, a tablet, and a netbook, among others. Object 101 may include any object capable of displaying text data, such as a receipt, a hotel folio, a transportation ticket (e.g., a train stub, parking stub, etc.), and a point of sale display screen, among others.

Video capture device 102 serves to capture videos. In some embodiments, a video can include several successive frames captured by video capture device 102. In such embodiments, the video may be stored as a single file. For the example shown in FIG. 1, frames 106 are successive frames of a video captured by video capture device 102. Video capture device 102 may be a front-facing camera or a rear-facing camera. Video capture device 102 may communicate with user interface 124 to, for example, provide a preview of the video being captured by video capture device 102. In this manner, a user of mobile device 100 may ascertain what is being captured by video capture device 102 and point video capture device 102 to capture object 101. In some embodiments, video capture device 102 is configured to capture high definition (HD) frames (e.g., 1080p or higher) at a sufficiently high frame rate (24 frames per second (fps) or higher).

Image store 104 serves to store frames of a video. In the example shown, image store 104 stores frames 106 once captured by video capture device 102. Image store 104 may comprise any type of memory, including cache memory, main memory, and non-volatile memory, among others. Generally, image store 104 may be configured to store frames 106 temporarily and so long as it is being used by mobile device. For example, image store 104 may discard frames of frames 106 after they are no longer being utilized by mobile device 100. In some embodiments, particular ones of frames 106 are persisted in image store 104 or elsewhere on mobile device 100 for record keeping and reporting purposes. In some embodiments, image store 104 may be memory and not, for example, storage (e.g., a solid-state drive, a hard drive, etc.). In these embodiments, by keeping frames 106 in memory and storage increases a speed and efficiency of downstream processes. Image store 104 enables object detector 108 and user interface 124 to access frames 106.

Object detector 108 serves to perform object detection on frames of a video. In the example shown, object detector 108 performs object detection on frames 106. First, objector detector 108 retrieves frames 106 from image store 104. Object detector 108 next performs object detection on frames 106 to determine whether and which of frames 106 includes object 101. For example, object detector 108 may determine that certain frames in frames 106 contain object 101 whereas other frames in frames 106 do not. Once object detector 108 determines that a frame in frames 106 includes object 101, it outputs the frame to OCR ML model 110 and image-to-token model 114. In this example, object detector 108 does not output frames that do not include object 101.

In some embodiments, object detector 108 performs object detection on frames 106 sequentially. That is, object detector 108 retrieves and processes frames in the order in which they are captured by video capture device 102. In certain embodiments, object detector 108 may determine that a given frame includes two or more objects. In this case, object detector 108 may provide each of the two or more objects for downstream processing.

In certain embodiments, object detector 108 may modify the frame containing object 101 prior to outputting the frame to OCR ML model 110 and image-to-token model 114. In these embodiments, object detector 108 may modify the frame by cropping and de-warping the frame. In this example, object detector 108 may be configured to crop the frame to exclude portions of the frame that do not include object 101. If instead object 101 occupied the entirety of the frame, the object detector 108 may output the frame without cropping the frame to OCR ML model 110 and image-to-token model 114.

Furthermore, object detector 108 may de-warp the frame prior to communicating it to OCR ML model 110 and image-to-token model 114. For example, as is often the case, video capture device 102 may not be angled straight at object 101. Instead, video capture device 102 may have a perspective of object 101 that results in object 101 appearing warped in frames 106. Furthermore, object 101 may appear warped as a result of geometric distortions caused by a lens of video capture device 102. Object detector 108 may be configured to correct for angled perspectives and/or geometric distortions by transforming the frame such that a shape of object 101 is maintained or substantially maintained. That is, for example, if object 101 has a square shape, object detector 108 may transform a given frame having object 101 so that object 101 also has a square shape in the frame (e.g., and not, for example, a trapezoidal shape).

Thus, object detector 108 may output a modified frame that has been cropped and de-warped to OCR ML model 110 and image-to-token model 114. The modified frame as cropped and de-warped may serve to enhance performance of downstream processes such as an accuracy of OCR ML model 110, and image-to-token model 114, among others.

OCR ML model 110 serves to generate machine-readable text from physical text appearing in images. In the example shown, OCR ML model 110 is configured to generate machine-readable text from text data items written, printed, or displayed on object 101. OCR ML model 110 receives a frame containing object 101 from object detector 108. Next, OCR ML model 110 generates text corresponding to each of the text data items present in the frame. As an example, if object 101 includes a text data item that is a line item, OCR ML model 110 may convert the line item into machine-readable text representing the line item. In some embodiments, the line item may contain words describing a name of the expense as well as numbers corresponding to an amount of the expense. OCR ML model 110 is configured to generate text corresponding to the words and the numbers of the line item. OCR ML model 110 is configured to output the generated text to text-to-token model 112 and API client 116. In some embodiments, OCR ML model 110 may generate machine-readable text from machine-generated text (e.g., printed or displayed on a screen) with greater accuracy than it does from handwritten text.

Image-to-token model 114 serves to predict candidate data items from text data items appearing in images. In the example shown, image-to-token model 114 is configured to predict candidate data items from text data items written, printed, or displayed on object 101. Image-to-token model 114 receives a frame containing object 101 from object detector 108. Next, image-to-token model 114 predicts candidate data items from text data items present in the frame. It may accomplish this without first requiring OCR to be performed on the frame. That is, image-to-token model 114 may be configured to directly predict candidate data items from the frame itself and not from OCR-generated text.

Additionally, image-to-token model 114 may be further configured to generate confidence scores associated with the first set of predicted candidate data items. The confidence scores may represent the probability of the predicted candidate data item matching the text data item as determined by a particular model (e.g., one of image-to-token model 114, text-to-token model 112, and backend service 126 executed on computing device 118). Image-to-token model 114 outputs predicted candidate data items along with their confidence scores to consolidation engine 120.

In some embodiments, image-to-token model 114 is a machine learning model that has been trained with handwritten text data, and more particularly with handwritten numbers. If object 101 is a receipt from a restaurant, it may include text data items that are written by hand. This may be the case for the "tip" and "total" line items, for example. In this example, image-to-token model 114 may predict amount attributes of candidate data items (e.g., a tip amount or a total amount) with relatively high confidence scores. Image-to-token model 114 may likewise predict attributes of candidate data items from non-handwritten text data but may do so with lower confidence scores.

Text-to-token model 112 serves to predict candidate data items from machine-readable text. In the example shown, text-to-token model 112 is configured to predict candidate data items from text data items of object 101 that have been converted to machine-readable text via OCR ML model 110. Text-to-token model 112 receives generated text from OCR ML model 110. In response, text-to-token model 112 predicts candidate data items from the generated text. Similar to image-to-token model 114, text-to-token model 112 may generate confidence scores associated with each predicted candidate data item. Image-to-token model 114 outputs the predicted candidate data items along with their confidence scores to consolidation engine 120.

In some embodiments, text-to-token model 112 is a machine learning model that has been trained with machine-generated text data such as printed characters. As such, text-to-token model 112 may predict candidate data items from printed text data with relatively high confidence scores. Conversely, text-to-token model 112 may predict candidate data items from handwritten text data with relatively lower confidence scores.

In some embodiments, text-to-token model 112 is configured to predict attribute or token components of candidate data items. As noted above, candidate data items may include various attributes or tokens. Text-to-token model 112 may predict these tokens or attributes from object 101 (e.g., set a field for a token or attribute to a particular value).

API client 116 serves to communicate with computing device 118. In the example shown, API client 116 is configured to send generated text to backend service 126 executing on computing device 118. Backend service 126 is configured to send predicted candidate data items back to API client 116. Mobile device 100 may be remote from computing device 118 and may communicate data to and from computing device 118 via a network such as the Internet. Backend service 126 is configured to process the generated text using a machine learning model to predict a candidate data items from the generated text. Backend service 126, like image-to-token model 114 and text-to-token model 112, may provide confidence scores corresponding to the predicted candidate data items. Backend service 126 next communicates the candidate data items and the corresponding confidence scores to API client 116. In response, API client 116 communicates the candidate data items and the corresponding confidence scores to consolidation engine 120.

In some embodiments, backend service 126 executed on computing device 118 may be configured to predict candidate data items corresponding to tokens or attributes of text data items. For example, if the text data item is a line item, backend service 126 may be configured to predict tokens or attributes associated with the line item. In some embodiments, backend service 126 may predict tokens or attributes that text-to-token model 112 (or image-to-token model 114) is not necessarily configured to predict. For example, backend service 126 may predict tokens or attributes associated with an expense type in addition to tokens or attributes associated with an amount, a date, and a currency. In some embodiments, expense type attributes define a category or grouping of a particular expense (e.g., meals, transportation, lodging, etc.).

In some embodiments, backend service 126 may include several token prediction models. For example, in these embodiments, backend service 126 may include one model per token or attribute that is predicted. That is, for example, each model may be configured to predict a single attribute or token from a given text data item. Thus, for example, a first model may predict an amount attribute of a text data item, while a second model may predict a date attribute and a third model may predict a currency attribute of the same text data item, and so on. Once predicted, these predicted tokens are referred to as candidate data items.

Consolidation engine 120 serves to consolidate candidate data items predicted from the same text data item into the same group. In the example shown, consolidation engine 120 is configured to consolidate candidate data items predicted by different models and across a frames into priority queues. As noted above, consolidation engine 120 may receive candidate data items from image-to-token model 114, text-to-token model 112, and backend service 126. Consolidation engine 120 may place candidate data items predicted from these three models into the same priority queue if there is a likelihood that they pertain to the same text data item of object 101. That is, for example, a particular text data item may result in three candidate data items from the three models. Consolidation engine 120 may place those three candidate data items into the same priority queue.

Further, consolidation engine 120 may place candidate data items predicted from a subsequent frame by the three models into the same priority queue if those candidate data items pertain to the text data item of object 101. That is, for example, the subsequent frame may result in three more candidate data items also pertaining to the same text item of object 101. Consolidation engine 120 may place those three additional candidate data items in the same priority queue (e.g., which may now have a total of six candidate data items). If, on the other hand, the subsequent frame does not include object 101 but a distinct object, consolidation engine 120 may place candidate data items predicted from the distinct object in different priority queue since they pertain to distinct text data items.

Record manager 122 serves to find the best data items out of the candidate data items and populates a record with those data items. As used herein, a data item may be a candidate data item that has been selected by record manager record manager 122. In the example shown, record manager 122 is configured to select one or more candidate data items from the priority queues of consolidation engine 120 as a set of data items. Once selected, record manager 122 may populate a record with the set of data items. In some embodiments, record manager 122 may select candidate data items from each of the priority queues associated with the highest confidence score. Record manager 122 may also select a frame from the frames 106 to associate with the set of data items and to populate the record with. For example, if object 101 is a receipt, the text data items are line items, and the record is an expense report, record manager 122 may populate the expense report with line items from the receipt. In this example, record manager selects a frame displaying the receipt to populate the expense report with. As shown, record manager 122 communicates the set of data items and a selected frame to user interface 124 for display to a user. Record manager 122 may also receive requests to assign data items to particular records from user interface 124. In response, record manager 122 may assign data items to those particular records. Furthermore, record manager 122 may communicate the populated records to a remote server that maintains and processes the records.

In some embodiments, more than one object may be captured by video capture device 102 in frames 106. For example, a user may pan mobile device 100 across multiple objects and thereby capture the multiple objects in frames 106. Record manager 122 may associate sets of data items with objects from which they were predicted. For example, if object 1 contains line items A and B and object 2 contains line item C, record manager 122 may be configured to associate line items A and B with object 1 and line item C with object 2. In this manner, various sets of data items may be grouped according to the objects from which they were predicted for reporting purposes.

User interface 124 allows a user to interact with mobile device 100. In the example shown, user interface 124 may display data items as predicted from objects to a user for verification and management. User interface 124 may receive data items and respective frames from record manager 122. Next, user interface 124 may display data items along with the selected frame for the user to review and validate. Further, user interface 124 may allow the user to assign the set of data items to particular records. For example, if object 101 is a receipt, a user may assign data items predicted from object 101 to particular records (e.g., expense reports) for reporting. User interface 124 may communicate a request to assign a data item to a particular record to record manager 122.

Figure 2:
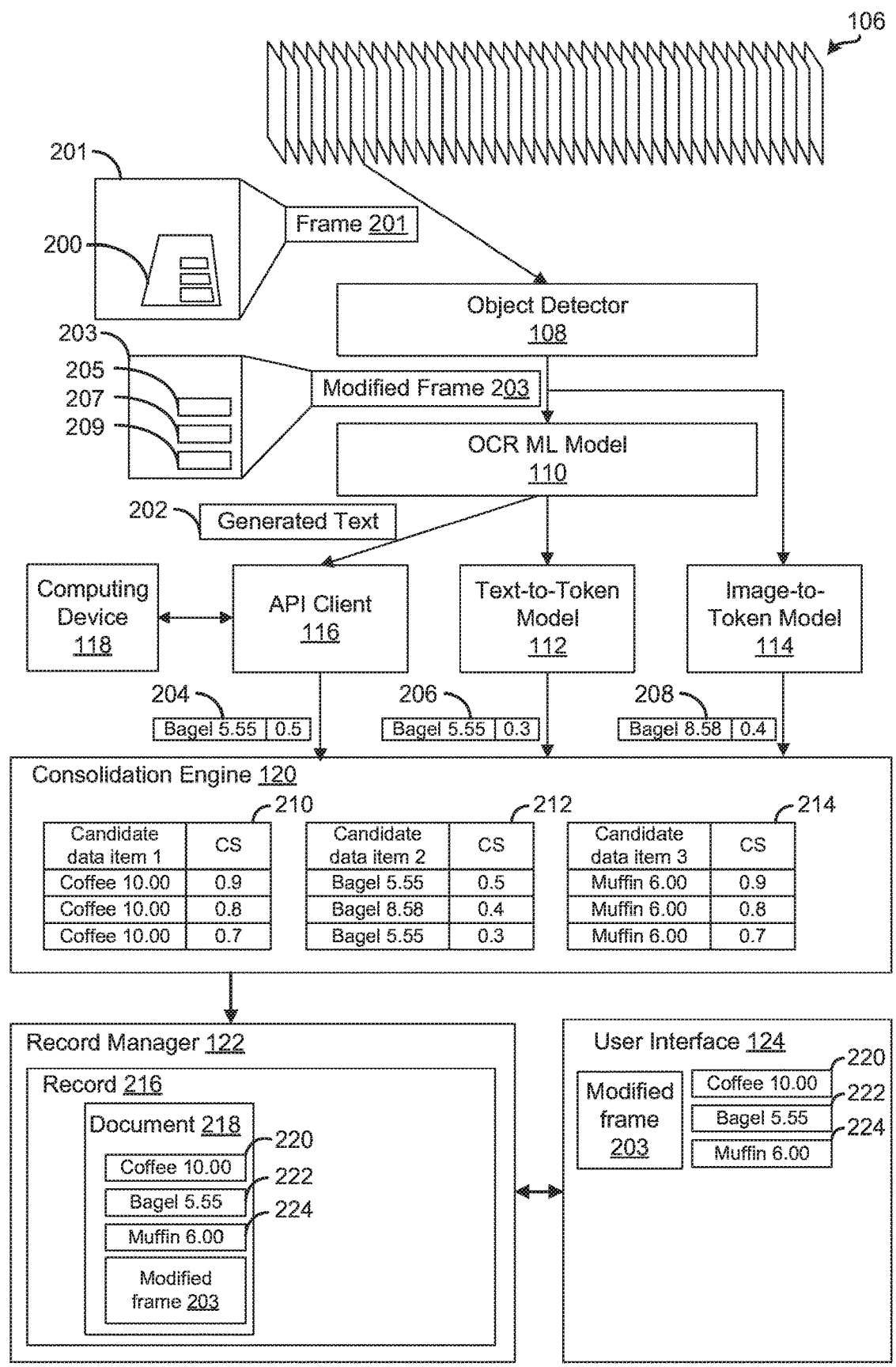
FIG. 2 illustrates prediction of data items from an object using methods and systems described here, according to one embodiment.

FIG. 2 illustrates an example of predicting data items from an object in a frame, according to one embodiment. In the example shown, object detector 108 retrieves frame 201 of frames 106. Frame 201 is shown to include object 200 having three text data items. In this example, object 200 may be a receipt having three line items as the three text data items.

In this example, object detector 108 determines that frame 201 includes object 200. Further, object detector 108 modifies frame 201 by cropping and de-warping frame 201 to produce modified frame 203. Modified frame 203 is shown to be cropped and de-warped. Modified frame includes text data items 205-209. In the present receipt example, text data item 205 may be a line time including a descriptor "Coffee" and an amount "10.00." Text data item 207 may be a line item including a descriptor "Bagel" and an amount "8.88." Text data item 209 may be a line item including a descriptor "Muffin" and an amount "6.00." As shown, object detector 108 outputs modified frame 203 to OCR ML model 110 and image-to-token model 114.

In the example shown, OCR ML model 110 generates generated text 202, which may include machine-readable text corresponding to text data items 205-209. In the present receipt example, generated text 202 may comprise the text of "Coffee," "10.00," "Bagel," "Muffin," and "6.00." For illustrative purposes, OCR ML model 110 may have erred in converting the amount associated with "Bagel." Instead of generating "8.88," OCR ML model 110 may have generated "5.55." The erroneous text of "5.55" may also be included in generated text 202. As shown, OCR ML model 110 outputs generated text 202 to text-to-token model 112 and API client 116.

In the example shown, image-to-token model 114 predicts candidate data items from each of text data items 205-209. Image-to-token model 114 may predict the descriptor and the attributes of the candidate data items from each of text data items 205-209. In the example shown, image-to-token model 114 has correctly predicted the descriptor "Bagel" but incorrectly predicted the amount attribute "8.58" (e.g., instead of "8.88") in candidate data item 208. In addition to candidate data item 208, image-to-token model 114 may predict candidate data items from text data items 205 and 209. In the present receipt example, image-to-token model 114 may correctly predict "Coffee" and "10.00" from text data item 205 and "Muffin" and "6.00" from text data item 209. Image-to-token model 114 outputs the candidate data items predicted from text data items 205-209 (the candidate data items predicted for text data items 205 and 209 are not shown) to consolidation engine 120.

In the example shown, text-to-token model 112 predicts candidate data items from generated text 202. Text-to-token model 112 is shown to predict candidate data item 206 including a descriptor "Bagel" and an amount attribute "5.55" from generated text 202. Although not shown, text-to-token model 112 predicts candidate data items associated with text data items 205 and 209 from generated text 202. In the present receipt example, text-to-token model 112 may correctly predict "Coffee" and "10.00" of text data item 205 and "Muffin" and "6.00" of text data item 209. Text-to-token model 112 outputs the candidate data items predicted from text data items 205-209 to consolidation engine 120 (the candidate data items predicted for text data items 205 and 209 are not shown).

API client 116 communicates generated text 202 to computing device 118. Computing device 118 may execute a backend service for predicting candidate data items from generated text 202, which are then communicated back to API client 116. In the example shown, the backend service predicts candidate data item 204 comprising descriptor "Bagel" and an amount attribute "5.55." Although not shown, backend service also predicts candidate data items associated with text data items 205 and 209 from generated text 202. In the present receipt example, backend service may correctly predict "Coffee" and "10.00" of text data item 205 and "Muffin" and "6.00" of text data item 209. Backend service communicates the candidate data items predicted from text data items 205-209 to API client 116. Once received, API client 116 communicates the candidate data items to consolidation engine (the candidate data item predicted for text data items 205 and 209 are not shown).

As noted above, the backend service may predict attributes in candidate data items that text-to-token model 112 and image-to-token model 114 are not necessarily configured to predict. For example, although not shown, backend service may predict an expense type attribute of candidate data item 304 to be "Refreshments." These additional attributes of candidate data items help to enrich the data in records submitted by record manager 122.

Consolidation engine 120 receives candidate data items predicted by text-to-token model 112, image-to-token model 114, the backend service executing on computing device 118. Consolidation engine 120 includes priority queues 210-214. Priority queue 210 is shown to include candidate data items predicted from text data item 205 (e.g., the line item pertaining to coffee). For example, the candidate data item associated with a confidence score ("CS") of "0.9" may have been predicted by text-to-token model 112, while the candidate data item associated with a confidence score "0.8" may have been predicted by image-to-token model 114 and the candidate data item associated with a confidence score of "0.7" may have been predicted by the backend service executed on computing device 118. Priority queue 212 is shown to include candidate data items 204-208 predicted from text data item 207 (e.g., the line item pertaining to a bagel). Finally, priority queue 214 is shown to include candidate data items predicted from text data item 209 (e.g., the line item pertaining to a muffin).

As noted above, candidate data items may have many components. For example, a candidate data item may include a descriptor and a number of attributes. The attributes may include an amount, a date, a currency, a vendor, and an expense type, among others. In some embodiments, text-to-token model 112, image-to-token model 114, and the backend service executing on computing device 118 may predict these various components and generate confidence scores for each component. Thus, for example, these models may generate confidence scores of each of the amount, date, currency, vendor, and expense type attributes. In some contexts, the amount attribute may be the attribute whose accuracy is most relevant for reporting purposes. As a result, priority queues 210-214 may be prioritized according to the confidence score associated with the amount attribute of candidate data items. Taking priority queue 212 as an example, the candidate data item with an amount attribute of "5.55" may be prioritized over those with amount attributes of "8.58" and "5.55." In other embodiments, attributes other than the amount may be prioritized over others.

Record manager 122 may select candidate data items associated with the highest confidence score from priorities queues 210-214. Record manager 122 is shown to include record 216. Record 216 is shown to include document 218. Record 216 may be any record that is capable of being populated with data items. For example, record 216 may be an expense report that is capable of being populated with line items. Document 218 may be a grouping of data items according to origin. For example, document 218 may group line items within an expense report according to the expense-related document from which they were predicted.

According to the embodiment shown, record manager 122 selects data item 220 from priority queue 210, data item 222 from priority queue 212, and data item 224 from priority queue 214. Record manager 122 next populates record 216 with data items 220-224. Record manager 122 is also shown to populate record 216 with modified frame 203. Record manager 112 is shown to group data items 220-224 and modified frame 203 in document 218.

In this example, record manager 122 outputs data items 220-224 and modified frame 203 to user interface 124. As a result, user interface 124 may enable the user to view data items 220-224 and modified frame 203. Additionally, user interface 124 may enable the user to assign data items 220-224 to a record other than record 216.

Figure 3:
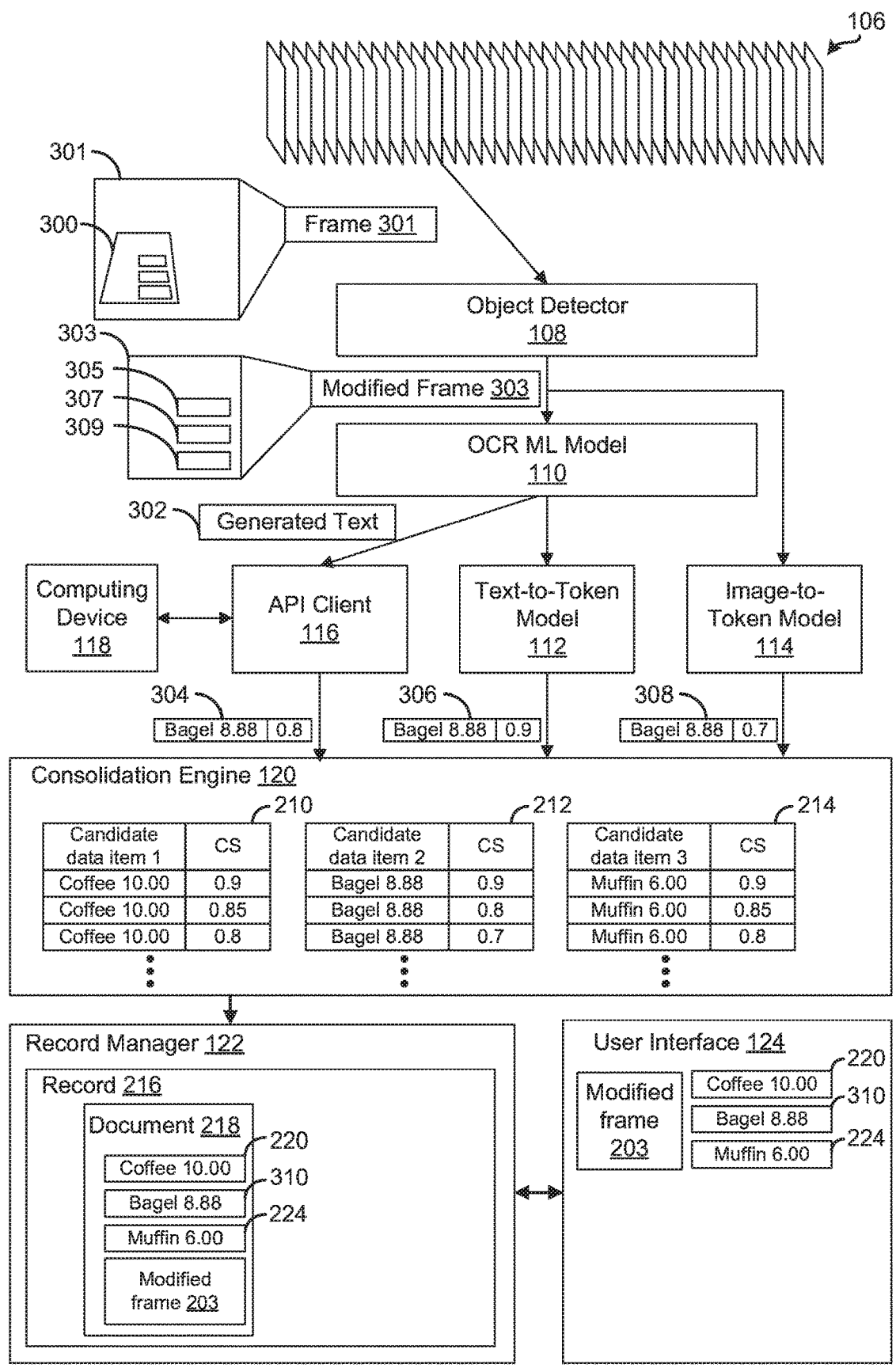
FIG. 3 illustrates a process of predicting candidate data items from a subsequent frame, according to one embodiment.

FIG. 3 illustrates a process of predicting candidate data items from a subsequent frame, according to one embodiment. For example, FIG. 3 may illustrate prediction of candidate data items from a frame subsequent to frame 201 of FIG. 2. Subsequent frame 301 is shown to be a frame in frames 106 that is captured subsequent in time to frame 201. In some embodiments, subsequent frame 301 may be the frame that immediately succeeds frame 201. In other embodiments, subsequent frame 301 may be separated from frame 201 by several frames. In these embodiments, object detector 108 may retrieve the most recently captured frame once it is finishes processing frame 201.

Frame 301 is shown to include object 300. Object 300 may be captured from the same real-world object as object 201 was. For example, object 300 is shown to include text data items 305-309 that represent the same line items as text data items 205-209 represent. According to FIG. 3, object detector 108 performs object detection on frame 303 and outputs modified frame 303 to OCR ML model 110 and image-to-token model 114.

OCR ML model 110 proceeds to generate machine-readable text from modified frame 303. In this example, OCR ML model 110 may output generated text 302 comprising "Coffee," "10.00," "Bagel," "8.88," "Muffin," and "6.00." Recall from FIG. 2 that OCR ML model 110 incorrectly converted "8.88" of text data item 207 to "5.55." The error in generated text 202 may be propagated to inaccurate candidate data items in priority queue 212 and inaccurate data item 222 in record 216. Here, OCR ML model 110 correctly converts text data item 307 to machine-readable text in generated text 302. This may be the case if frame 301 happened to be more glare-free, at a better angle, or more focused than frame 201 with respect to text data item 307. OCR ML model 110 outputs generated text 302 to API client 116 and text-to-token model 112.

Text-to-token model 112 predicts candidate data items from generated text 302. In the example shown, text-to-token model 112 correctly predicts an amount attribute "8.88" of candidate data item 306. Text-to-token model 112 is also shown to generate a confidence score "0.9" associated with the predicted amount attribute. Text-to-token model 112 may also correctly predict candidate data items associated with text data items 305 and 309 from generated text 302. Text-to-token model 112 outputs candidate data items to consolidation engine 120 (candidate data items predicted for text data items 305 and 309 are not shown).

API client 116 communicates generated text 302 to computing device 118. Computing device 118 executes a backend service to predict candidate data items from generated text 302. Here, backend service correctly predicts an amount attribute "8.88" with a confidence score "0.8" of candidate data item 304. Backend service may also correctly predict candidate data items associated with text data items 305 and 309 from generated text 302. Computing device 118 communicates the predicted candidate data items to API client 116. API client 116 communicates the candidate data items to consolidation engine 120 (candidate data items predicted for text data items 305 and 309 are not shown).

In the example shown, image-to-token model 114 correctly predicts an amount attribute "8.88" with a confidence score "0.7" of candidate data item 308. Image-to-token model 114 may also correctly predict candidate data items associated with text data items 305 and 309 from modified frame 303. Image-to-token model 114 outputs the candidate data items to consolidation engine 120 (candidate data items predicted for text data items 305 and 309 are not shown).

As noted above, consolidation engine 120 is configured to consolidate candidate data items predicted from the same text data into the same priority queue. In this example, frames 201 and 301 include the same text data appearing in the same real-world object. Thus, candidate data items predicted from frame 301 should be placed into existing priorities queues 210-214 containing candidate data items predicted from frame 201. For example, each of candidate data items 304-308, which pertain to line item "Bagel," should be placed into priority queue 212. Consolidation engine 120 ensures candidate data items predicted from the same text data are placed into the same the same priority queue. This enables selection of the best candidate data item from the pool of candidate data items predicted from the same text data. Furthermore, consolidation engine 120 prevents duplicate priority queues for candidate data items originating from the same text data item.

Consolidation engine 120 may employ two methods to determine whether candidate data items originating from a first and second frame should be placed into the same priority queue. These may be referred to as text-based similarity and image-based similarity. In the text-based similarity method, the OCR-generated text from the first frame is compared to the OCR-generated text from the second frame. In the example shown, generated text 302 is compared to generated text 202. In this method, OCR-generated text from the first and second frame are converted into vector representations. Next, a cosine similarity is performed on the vector representations to determine an angular distance between the vector representations in vector space. If the angular distance between the vector representations is below a threshold, the OCR-generated text from the first and second frames may be deemed a match. If, on the other hand, the angular distance is above a threshold, the OCR-generated text from the first and second frames may be too dissimilar to be considered a match. In the case of a non-match, there is a high probability that the objects appearing in the first and second frames are distinct. As a result, candidate data items predicted from the object of the second frame will be placed into new priority queues.

If there is a match between the OCR-generated text from the first and second frames, attributes of candidate data items from the first frame are next compared to those of candidate data items from the second frame. In some embodiments, the amount, date, a currency attributes are compared across the two frames. If there is a match between these attributes, there is a low likelihood that the object appearing in the first and second frames are distinct. As a result, candidate data items originating from the second frame are placed into priorities queues containing candidate data items originating from the first frame. Conversely, if there is no match between these attributes, there is a high likelihood that the objects appearing in the first and second frames are distinct despite there being a match between the OCR-generated texts. As a result, candidate data items originating from the second frame are placed into distinct priority queues.

According to the image-based similarity method, the first frame is compared to the second frame using an image similarity algorithm. The image-similarity algorithm generates a score representing how visually similar the first and second frames are. If the score is above a predetermine threshold, the first and second frames may be deemed a match. As a match, there is a high probability that an object appearing in the first frame is the same object appearing in the second frame. As a result, candidate data items from the first and second frames may be placed into the same priority queues. Conversely, if the score generated by the image similarity algorithm is below the predetermine threshold, then the first and second frames may be deemed a non-match. As a non-match, there is a high probability that the object appearing the first frame is distinct from the object appearing in the second frame. As a result, candidate data items originating from the first and second frames are placed into distinct priority queues.

Returning to FIG. 3, one or both of text-based similarity and image-based similarity may be performed to determine that candidate data items originating from frame 303 should be placed into priority queues 210-214 and not new priority queues. Consolidation engine 120 places candidate data items predicted from text data items 305-309 into priority queues 210-214. For example, candidate data items 304-308 are placed into priority queue 212. In so doing, priority queue 212 may include six candidate data items (e.g., data items 204-208 and data items 304-308, although data items 204-208 are not shown in FIG. 3).

Record manager 122 selects the best candidate data items to populate record 216 with. As shown, record manager 112 selects candidate data item 306 as data item 310, and updates record 216 with data item 310. Data items 220 and 224 may remain in record 216 because candidate data items predicted from text data items 305 and 309 are not associated with the highest confidence scores in their respective priority queues 210 and 214.

As noted above, record manager 122 also selects a frame to populate record 216 with. Here, record manager 122 has two choices: modified frame 203 or modified frame 303. In some embodiments, record manager 122 selects a frame that generated the highest number of high confidence scores. In some of these embodiments, an average of all of the confidence scores generated from the frame may be taken. These confidence scores may include those generated for various attributes of candidate data items as well as for multiple candidate data items. Record manager 122 may thus select a frame associated with the highest average across all of these confidence scores. As shown, record manager 122 selects modified frame 203 over modified frame 303. Record manager 122 communicates data items 220, 224, and 310, as well as modified frame 203 to user interface 124 for display.

Figure 4:
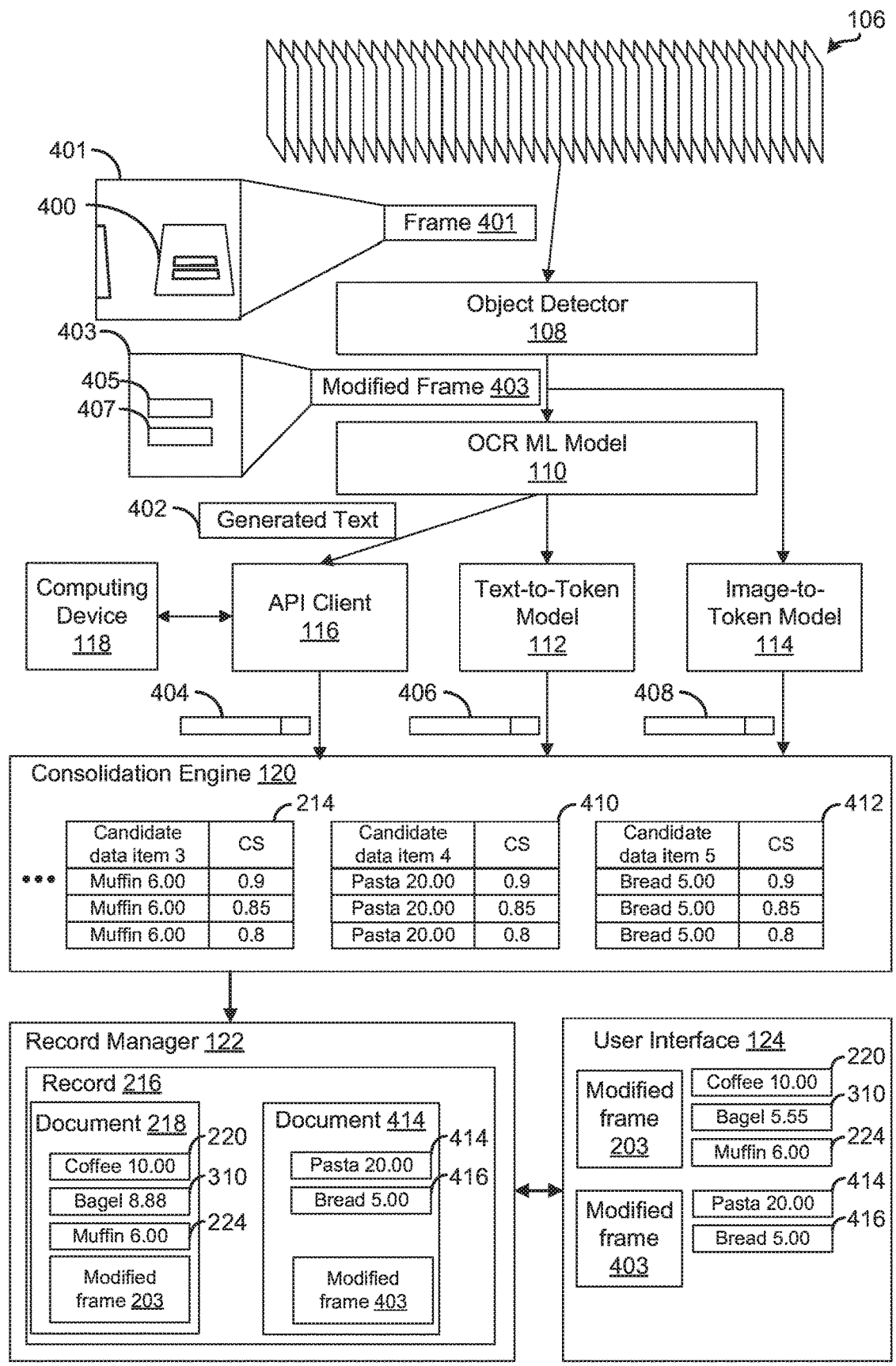
FIG. 4 illustrates a process of predicting candidate data items from a subsequent frame, according to one embodiment.

FIG. 4 illustrates a process of predicting candidate data items from a subsequent frame, according to one embodiment. As shown, subsequent frame 401 may be subsequent in time to both frame 301 and frame 201. Frame 401 is shown to include object 400. Object 400 may have been captured from a different real-world object than objects 200 and 300 were. For example, object 400 may pertain to a different expense document than the expense document to which objects 200 and 300 pertain. Object 400 is shown to include text data items 405 and 407. In this example, text data item 405 may be a line item for "Pasta" and text data item 407 may be a line item for "Bread."

According to FIG. 4, object detector 108 performs object detection on frame 401 to determine that frame 401 includes an object. As shown, object detector 108 outputs modified frame 403 to OCR ML model 110 and image-to-token model 114. As noted above, object detector 108 may crop and de-warp frame 401 to generate modified frame 403.

OCR ML model 110 proceeds to generate machine-readable text from modified frame 403. In this example, OCR ML model 110 may output generated text 402 comprising "Pasta," "20.00," "Bread," and "5.00." Moreover, generated text 402 may include any other text data appearing in object 400, for example, a date, a vendor name, and a currency, among others. OCR ML model 110 outputs generated text 402 to text-to-token model 112 and API client 116.

Text-to-token model 112 predicts candidate data items from generated text 402. In the example shown, text-to-token model 112 may correctly predict an amount attribute "20.00" of a candidate data item associated with "Pasta" and an amount attribute "5.00" of a candidate data item associated with "Bread." As shown, text-to-token model 112 outputs candidate data items 406 to consolidation engine 120. Candidate data items 406 may include candidate data items predicted for text data items 405 and 407.

API client 116 also receives generated text 402 and forwards it to computing device 118. Computing device 118 executes a backend service to predict candidate data items from generated text 402. Here, backend service correctly predicts amount attributes of "20.00" and "5.00" of candidate data items 404. Computing device 118 communicates the predicted candidate data items 404 to API client 116. API client 116 then communicates candidate data items 404 to consolidation engine 120. Candidate data items 404 may include candidate data items predicted for text data items 405 and 407.

Image-to-token model 114 predicts candidate data items from frame 403. Here image-to-token model 114 correctly predicts amount attributes associated with candidate data items 408. Additionally, image-to-token model 114 may correctly predict descriptors "Pasta" and "Bread" of candidate data items 408. Image-to-token model 114 is shown to output candidate data items 408 to consolidation engine 120. Candidate data items 408 may include candidate data items predicted for text data items 405 and 407.

In FIG. 4, consolidation engine 120 is configured to ensure that distinct expenses are reported distinctly. That is, consolidation engine 120 should ensure that candidate data items predicted from distinct objects are not placed into the same priority queues. In this example, consolidation engine 120 places candidate data items 404-408 predicted from object 400 into new priority queues 410 and 412.

As noted previously, consolidation engine 120 may perform text-based similarity and/or image-based similarity. Here, consolidation engine 120 may perform text-based similarity between generated text 402 and generated text 202 and/or between generated text 402 and generated text 302. Also, consolidation engine 120 may perform image-based similarity between modified frame 403 and modified frame 203 and/or modified frame 403 and modified frame 303. Based on these methods, consolidation engine 120 determines that candidate data items 404-408 should be placed in new priority queues 410 and 412.

Record manager 122 is shown to select candidate data items from priority queues 410 and 412 as data items 414 and 416. Next, record manager 122 populates record 216 with data items 414 and 416. Additionally, record manager 122 is shown to populate record 216 with frame 403. In the example shown, record manager 122 groups data items 220, 224, 224 and modified frame 203 into document 218 and data items 414-416 and modified frame 403 into document 414. In this manner, data items originating from the same object may be grouped together and reported as a group. Record manager 122 communicates data items 414-416 and modified frame 403 to user interface 124 for display to a user.

Once displayed on user interface 124, a user may verify the accuracy of each of the data items displayed. They may be assisted in their verification by referencing the displayed modified frames 203 and 403. Further, the user may assign the displayed data items 220, 310, 224, 414, and 416 to a record other than record 216 for reporting.

Figure 5:
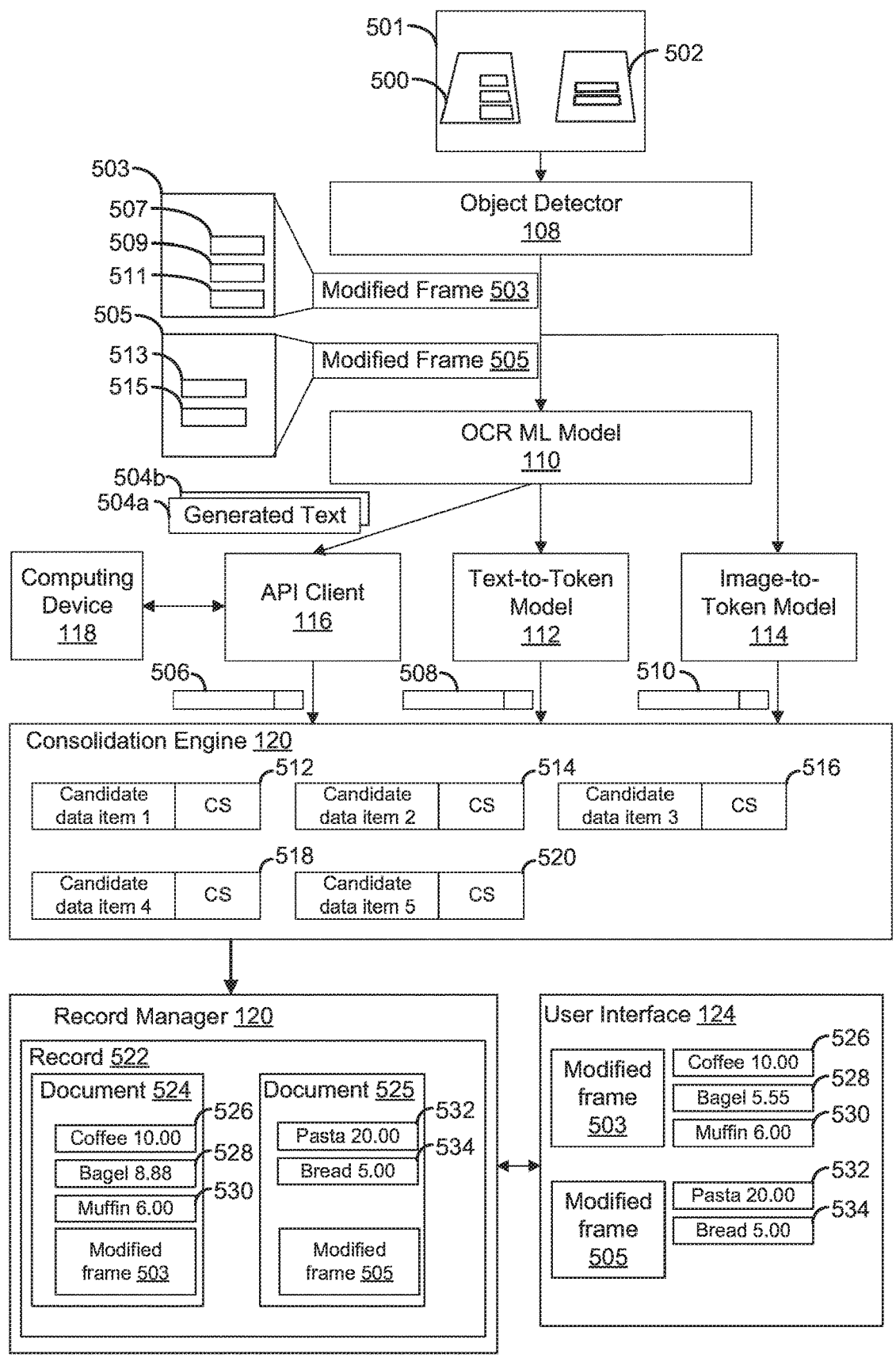
FIG. 5 illustrates a process of predicting candidate data items from multiple objects present in a single frame, according to one embodiment.

FIG. 5 illustrates a process of predicting candidate data items from multiple objects present in a single frame. As shown, frame 501 includes first object 500 and second object 502. As an example, object 500 may be captured from the same real-world object as objects 200 and 300 are captured, while object 502 may be captured from the same real-world object as object 400 is captured. Object 500 is shown to include text data items 507-511 and object 502 is shown to include text data items 513-515.

As shown in FIG. 5, object detector 108 determines that frame 501 includes two objects. Object detector is shown to output modified frame 503 corresponding to object 500 and modified frame 505 corresponding to object 502. Object detector 108 may have cropped and de-warped frame 501 to generate modified frames 503 and 505. Object detector 108 is shown to output modified frames 503 and 505 to OCR ML model 110 and image-to-token model 114.

OCR ML model 110 proceeds to generate machine-generated text from modified frames 503 and 505. In this example, OCR ML model 110 may output generated text 504a from modified frame 503 and generated text 504b from generated text 505. Generated text 504a may include "Coffee," "10.00," "Bagel," "8.88," "Muffin," "6.00." Generated text 504b may include "Pasta," "20.00," "Bread," and "5.00." OCR ML model 110 outputs generated text 504a and 504b to API client 116 and text-to-token model 112.

Text-to-token model 112 predicts candidate data items from generated text 504a and 504b and outputs candidate data items 508 predicted from both generated text 504a and 504b to consolidation engine 120. Candidate data items 508 may include candidate data items predicted for text data items 507-515. API client 116 is shown to send generated text 504a and 504b to computing device 118 and to receive candidate data items 506 predicted from generated text 504a and 504b from computing device 118. API client 116 is also shown to forward the predicted candidate data items 506 to consolidation engine 120. Candidate data items 506 may include candidate data items predicted for text data items 507-515. Image-to-token model 114 predicts candidate data items 510 from modified frames 503 and 505 and outputs candidate data items 510 to consolidation engine 120. Candidate data items 510 may include candidate data items predicted for text data items 507-515.

Consolidation engine 120 is shown to place candidate data items 506-510 into priority queues 512-520. As noted above, consolidation engine 120 ensures that candidate data items predicted from the same text data item are placed into the same priority queue and that candidate data items predicted from different text data items are placed into different priority queues. For example, priority queue 512 may contain candidate data items predicted from the "Coffee" text data item; priority queue 514 may contain candidate data items predicted from the "Bagel" text data item; priority queue 516 may contain candidate data items predicted from the "Muffin" text data item; priority queue 518 may contain candidate data items predicted from the "Pasta" text data item; and priority queue 520 may contain candidate data items predicted from the "Bread" text data item. In this manner, record manager 122 may select the best candidate data items as the data items to populate a record with.

Record manager 122 is shown to select one data item from each of priority queues 512-520. For example, record manager 122 selects data items 526-534, each predicted from a different one of text data items 507-515. Record manager 122 is also shown to select modified frame 503 and 505 to populate record 522 with. Furthermore, record manager 122 groups data items 526-534 and modified frames 503 and 505 according to origin. That is, since data items 526-530 are predicted from modified frame 503, they are grouped in document 524. And since data items 532 and 534 are predicted from modified frame 505, they are grouped in document 525. Record manager 122 communicates data items 526-534 and modified frames 503-505 to user interface 124 for display. User interface 124 is shown to display data items 526-534 and modified frames 503 and 505 for display to a user. The user may also be enabled to assign the displayed data items to different records. For example, the user may assign data items 526-530 to a different record than they do data items 532-534.

Figure 6:
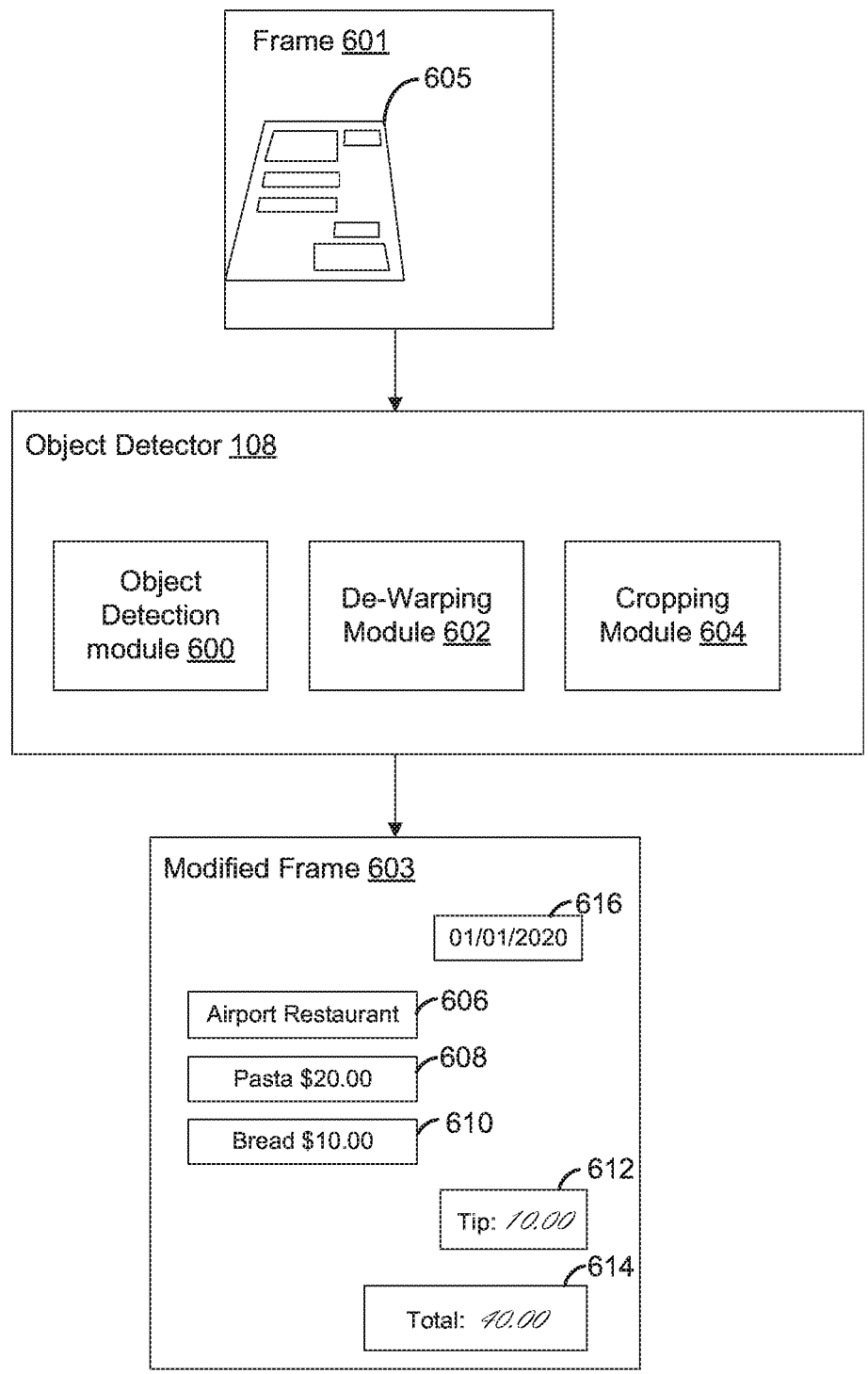
FIG. 6 shows an object detector and an exemplary process it performs, according to one embodiment.

FIG. 6 shows an example of an object detector and an exemplary process it performs, according to one embodiment. Object detector 108 is shown to include object detection module 600, de-warping module 602, and cropping module 604. Object detection module 600 may be responsible for determining whether frames include an object of interest. In some embodiments, object detection module 600 may be specifically adapted to detect expense related objects, such as papers, receipts, hotel folios, transportation tickets, and point of sale display screens. De-warping module 602 may be responsible for de-warping frame and the object it contains. For example, de-warping module 602 may correct for perspective and/or geometric distortions in received frames. By correcting for perspective and/or geometric distortions, de-warping module 602 may, for example, ensure that a captured object retains a similar or substantially similar shape as it has in the real world. Cropping module 604 may be responsible for removing portions of a captured frame that do not include an object of interest.

In the example shown, frame 601 includes object 605 having a number of text data items. In particular, object 605 is shown to include text data item 616 including a date, text data item 606 including a vendor name, text data item 608 including a line item for "Pasta," text data item 610 including a line item for "Bread," text data item 612 including a line item for "Tip," and text data item 614 including a line item for "Total." As shown, the amounts specified in text data items 612 and 614 are handwritten.

Further, as shown, object 605 is captured in frame 601 at an angle. For example, object 605 may be a receipt with a rectangular shape. However, due to the angle at which frame 601 was captured, object 605 appears in frame 601 with a trapezoidal shape. De-warping module 602 may serve to de-warp frame 601 such that object 605 retains a rectangular shape in modified frame 603. In this example, modified frame 603 is such that object 605 has been de-warped and retains a rectangular shape.

Additionally, as shown, object 605 does not occupy the entirety of frame 601. That is, for example, there are portions of frame 601 where object 605 does not reside. These portions may add noise to downstream processes. Cropping module 604 may serve to exclude those portions from modified frame 603. In this example, modified frame 603 is such that portions of frame 601 that do include object 605 are cropped out.

In some embodiments, object detector 108 is further configured to detect whether detected objects are receipts or hotel folios. Object detector 108 may achieve this by analyzing a shape of the object. For example, hotel folios are typically full-sized sheets of paper having particular dimensions (e.g., 8.5×11 inches or A4). By contrast, receipts do not typically have such dimensions. Object detector 108 may be configured to determine whether a given object is a receipt or a hotel folio based on the object's dimensions. If object detector 108 determines that an object is a hotel folio, it may provide such information to API client 116 to communicate to backend service 126. In doing so, object detector 108 may restrict backend service 126 in its prediction of the expense type attribute to "hotel."

Figure 7:
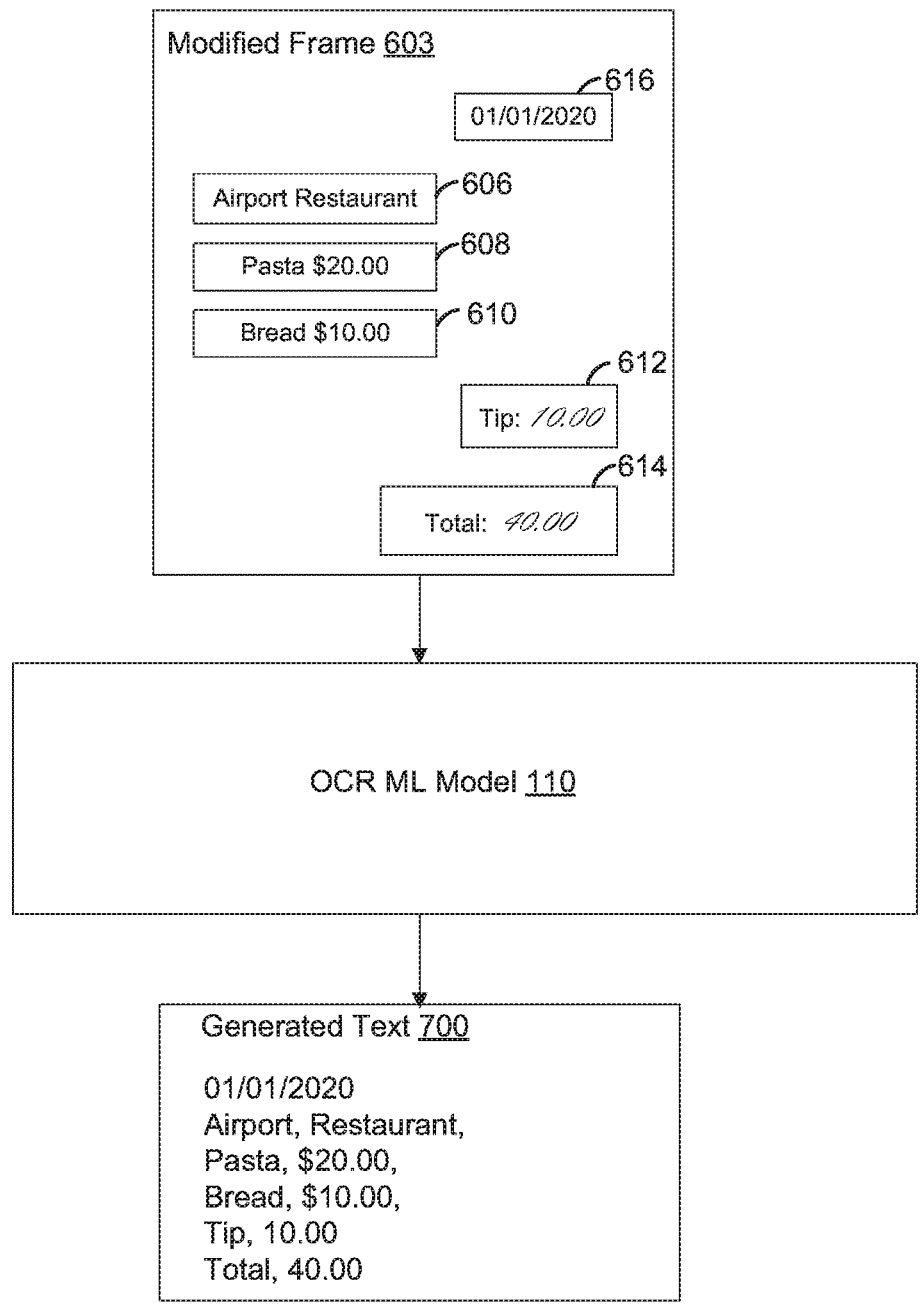
FIG. 7 shows an optical character recognition (OCR) machine learning (ML) module and an exemplary process it performs, according to one embodiment.

FIG. 7 shows an example of an OCR ML module and an exemplary process it performs, according to one embodiment. As discussed above, OCR ML module 110 is configured to generate machine-readable text from images. Any suitable optical character recognition software may be used by OCR ML module 110. Here, modified frame 603 is shown to include text data items 606-616. OCR ML module 110 generates generated text 700 from modified frame 603. Generated text 700 is shown to include strings of characters forming words or numbers or symbols. As used herein, characters refer to any visual component of any language, such as letters, words, abbreviations (e.g., "oz.," "dz.," "L," etc.), numbers, amounts, symbols (e.g., "@," "$," "%"), dates, currencies, and combinations thereof. OCR ML module 110 may also convert symbols such as slashes and dollar signs into machine-readable text in generated text 700.

In the embodiment shown, OCR ML model 110 may separate groups of characters, numbers, and symbols by a delimiter such as a comma or other character. This grouping of characters into words and numbers may assist downstream processes in predicting candidate data items. Also, as shown, OCR ML module 110 maintains an order of characters appearing in text data of a real world object in generated text 700. In the example shown, generated text 700 includes a date "01/01/2020," a vendor name "Airport Restaurant," line items for "Pasta," "Bread," "Tip," and "Total."

Figure 8:
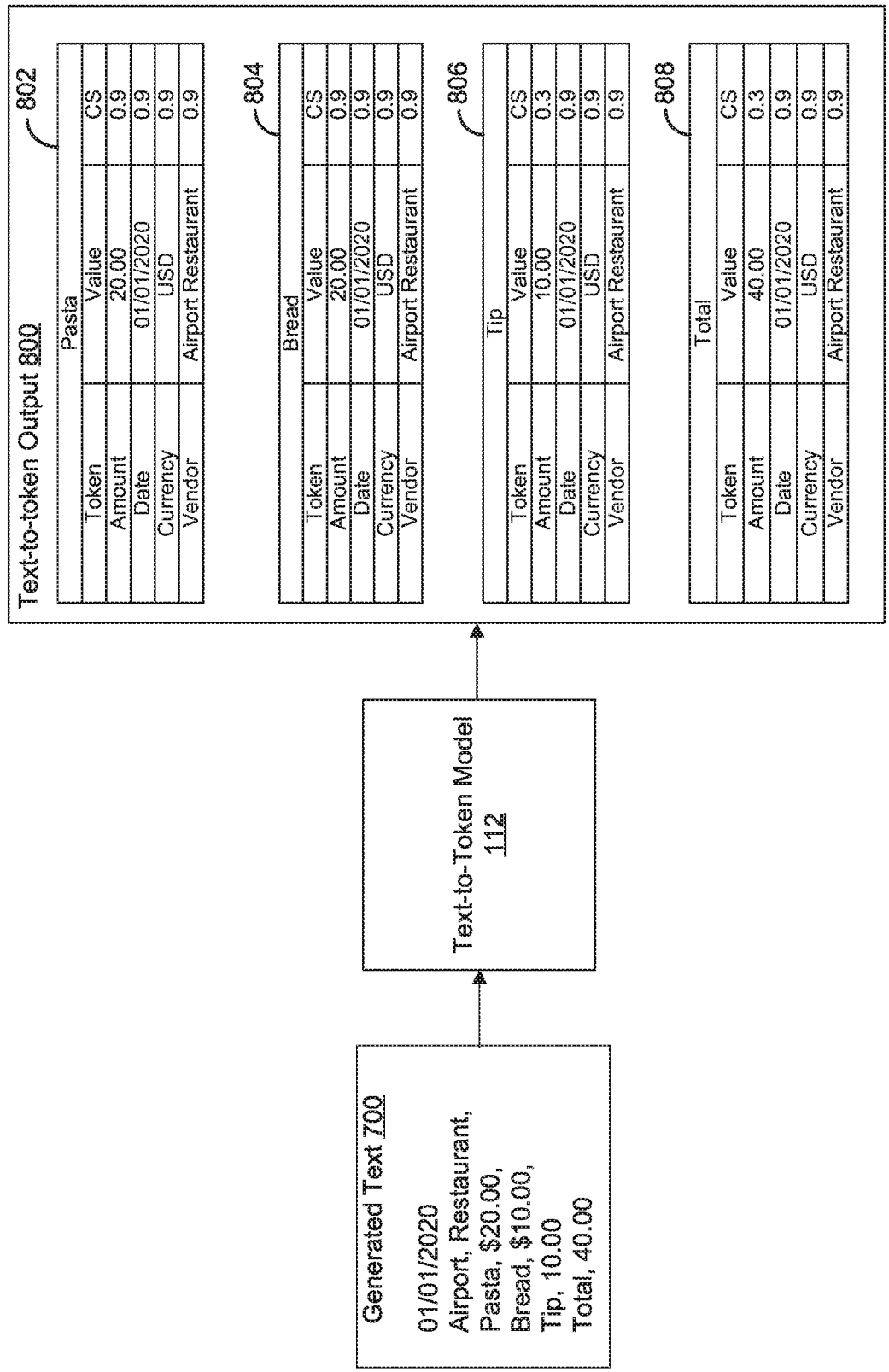
FIG. 8 shows a text-to-token model and an exemplary process it performs, according to one embodiment.

FIG. 8 shows an example of a text-to-token model and an exemplary process it performs, according to one embodiment. As discussed above, text-to-token model 112 predicts candidate data items from generated text. In the example shown, text-to-token model 112 predicts candidate data items 802-808 from generated text 700. As noted above, candidate data items may include several components, including a descriptor, attributes or tokens, and confidence scored associated with the attributes or tokens. In the example shown, candidate data item 802 as predicted by text-to-token model 112 includes a descriptor "Pasta." Candidate data item 802 includes an amount attribute with a value of "20.00" and associated confidence score "0.9," a date attribute "01/01/2020" and associated confidence score "0.9," a currency attribute "USD" and associated confidence score "0.9," and a vendor attribute "Airport Restaurant" and associated confidence score "0.9." In other embodiments, text-to-token model 112 may provide more attributes or less attributes than the ones shown. Text-to-token model 112 is shown to output candidate data items 802-808 in text-to-token output 800.

As shown, candidate data items 804-808 for "Bread," "Tip," and "Total" are likewise provided with amount, date, currency, and vendor attributes. As noted above, text-to-token model 112 may be adapted to predict candidate data items from machine-generated text with relatively high confidence scores. Text-to-token model 112 may, on the other hand, predict candidate data items from handwritten text data with relatively lower confidence scores. Since the amounts of the "Tip" and "Total" text data items are handwritten, the associated confidence scores of "0.3" and "0.3" are relatively lower than those for "Pasta" and "Bread," for example.

Figure 9:
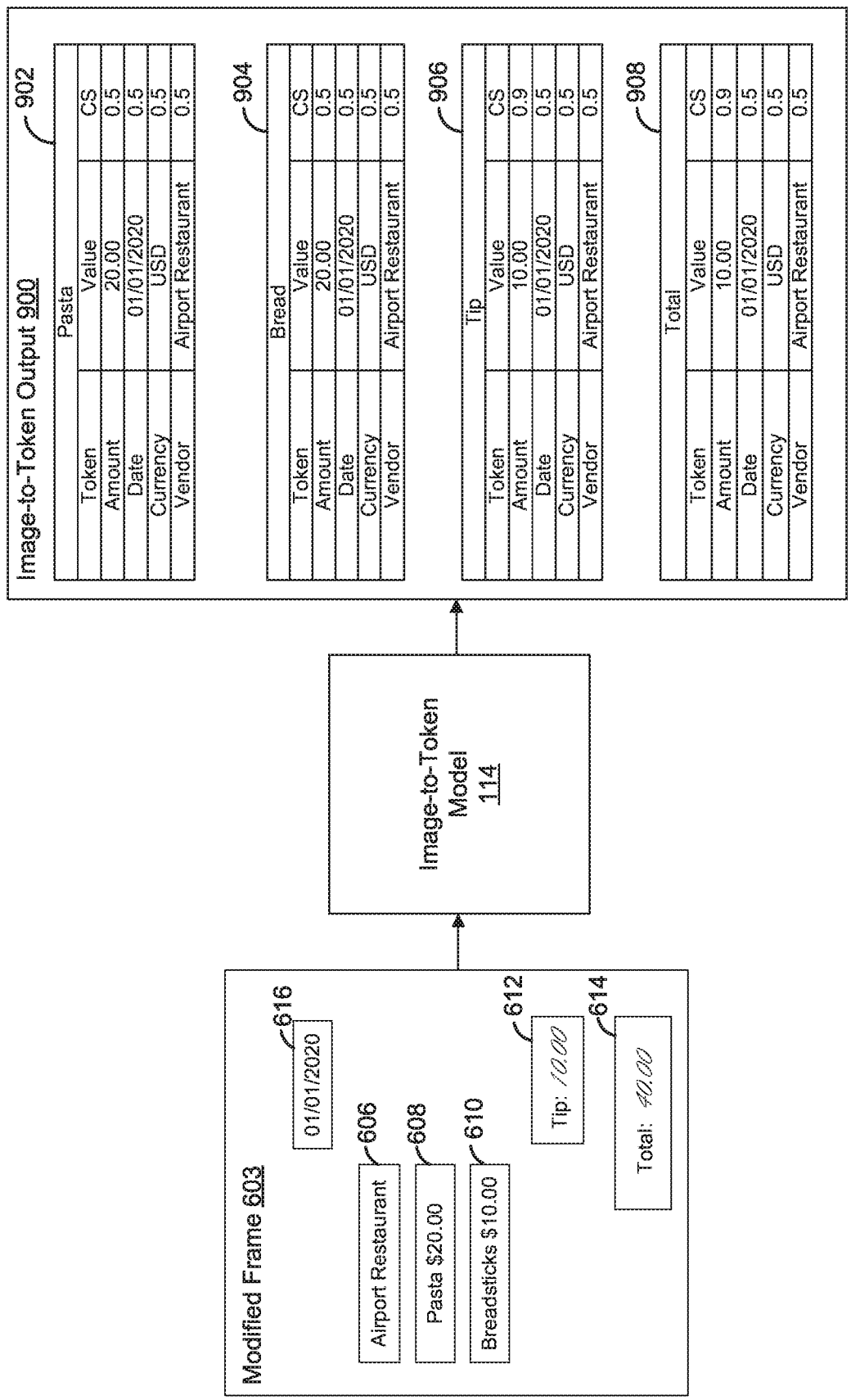
FIG. 9 shows an image-to-token model and an exemplary process it performs, according to one embodiment.

FIG. 9 shows an example of an image-to-token model and an exemplary process it performs, according to one embodiment. As discussed above, image-to-token model 114 may predict candidate data items from images or frames. In the example shown, modified frame 603 includes text data items 606-616. Image-to-token model 114 is shown to predict candidate data items 902-908 directly from text data items 606-616 as they appear in modified frame 603. That is, for example, unlike text-to-token model 112, image-to-token model 114 processes modified frame 603 as opposed to generated text 700.

Also, as noted above, image-to-token model 114 may be adapted to predict candidate data items from handwritten text with relatively higher confidence scores than it does candidate data items from machine-printed text. In the example shown, image-to-token model 114 predicts amount attributes of candidate data items 906 and 908 with relatively high confidence scores of "0.9." Conversely, image-to-token model 114 predicts other attributes such as amount attributes of candidate data items 902 and 904 with relatively lower confidence scores of "0.5." Moreover, in the example shown, image-to-token model 114 predicts the date, currency, and vendor attributes for each of candidate data items 902-908 with relatively lower confidence scores of "0.5." Once predicted, image-to-token model 114 outputs candidate data items 902-908 in image-to-token output 900.

Figure 10:
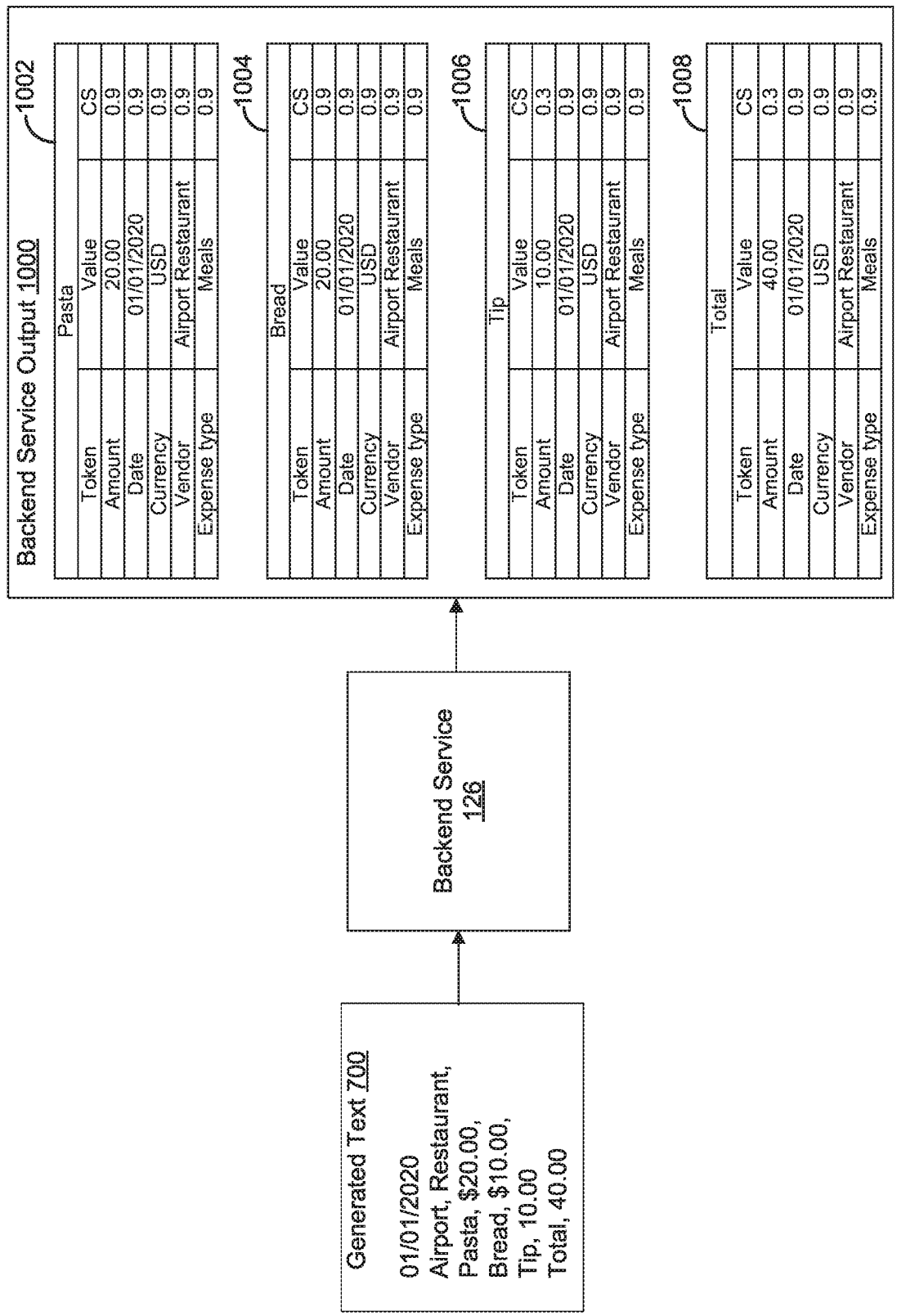
FIG. 10 shows a backend service and an exemplary process it performs, according to one embodiment.

FIG. 10 shows an example of a backend service and an exemplary process it performs, according to one embodiment. As noted above, backend service 126 predicts candidate data items from machine-readable text. Backend service 126 may receive generated text 700 from API client 116.

As noted above, backend service 126 may be executed by a remote computing device such as computing device 118. In some embodiments, computing device 118 may be a remote server that is communicated with using a network such as the Internet. In some embodiments, when mobile device 100 is not connected to computing device, candidate data items may be predicted and populated into a record without using backend service 126.

Also, as noted above, backend service 126 may be configured to predict attributes of candidate data items that text-to-token model 112 and image-to-token model 114 are not necessarily configured to predict. For example, and as shown, backend service 126 is shown to predict an expense type attribute for each of candidate data items 1002-1008 in addition to the amount, date, currency, and vendor attributes. Thus, backend service 126 may enrich predicted candidate data items with attributes that text-to-token model 112 and image-to-token model 114 are not necessarily configured to provide. Backend service 126 outputs candidate data items 1002-1008 in backend service output 1000.

In some embodiments, backend service 126 may be configured to restrict its prediction of the expense type attribute to "hotel" if object detector 108 determines that a captured object is a hotel folio. As discussed above, object detector 108 may be configured to determine dimensions of a captured object. If object detector 108 determines that the captured object has dimensions of a full sheet of paper (e.g., 8.5×11 inches or A4), object detector 108 may label the object as a hotel folio. Object detector 108 may communicate the label to API client 116. API client 116 may forward the label to backend service 126. When backend service 126 receives the label, it may set a value of the expense type attribute to "hotel" for each of the candidate data items it predicts from the object determined to be a hotel folio.

Figure 11:
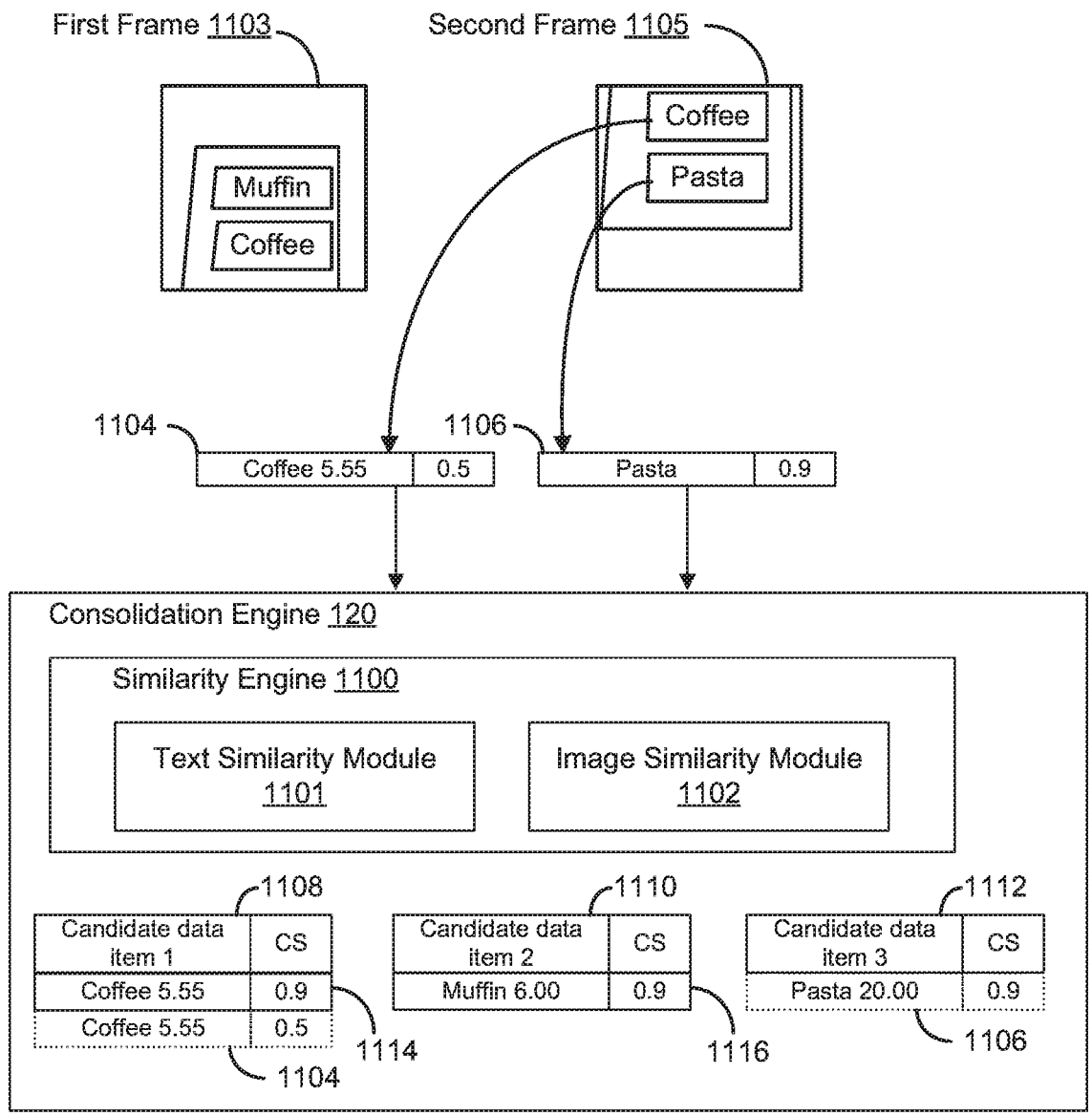
FIG. 11 shows a consolidation engine and an exemplary process that it performs, according to one embodiment.

FIG. 11 shows an example of a consolidation engine and an exemplary process that it performs, according to one embodiment. As discussed above, consolidation engine 120 ensures that candidate data items predicted from the same text data item (e.g. same line item) are placed in the same priority queue. Consolidation engine 120 also ensures that candidate data items predicted from different text data items (e.g., different line items) are placed in different priority queues. Thus, consolidation engine 120 advantageously enables (1) the best candidate data item to be selected out of all candidate data items predicted from the same text data item, and (2) the prevention of selecting duplicate candidate data items from the same text data item.

In the example shown, consolidation engine 120 includes similarity engine 1100. Similarity engine 1100 includes text similarity module 1101 and image similarity module 1102. Similarity engine 1100 may be configured to determine whether candidate data items originating from different frames are predicted from the same text data item. To do this, it may employ text similarity module 1101 and image similarity module 1102. Additionally, it may execute rules as to combining results from text similarity module 1101 and image similarity module 1102. For example, if text similarity module 1101 and image similarity module 1102 return contradicting results, similarity engine 1100 may be enabled to combine such contradicting results into a final result as to whether candidate data items originating from two frames are to be placed in the same or different priority queues.

Text similarity module 1101 may be configured to perform text-based similarity. For example, text similarity module 1101 may receive generated text from OCR ML module 110 for two distinct frames. Text similarity module 1101 may convert both of the generated texts into vector representations. Next, similarity module 1101 may perform cosine similarity on the vector representations to determine an angular distance separating the two vector representations. If the angular distance is above a threshold, the generated texts may be deemed a non-match. In this instance, objects from the two distinct frames may be deemed different objects. As a result, candidate data items predicted from the second frame may be placed into different priority queues than those predicted from the first frame.

If the angular distance is below a threshold, the generated texts may be deemed a match. Further, if the angular distance is below a threshold, a second test may be performed on the generated texts to ensure that objects captured by the two distinct frames are indeed distinct. Text similarity module 1101 may compare attributes of candidate data items predicted from the first frame with those of predicted from the second frame. In particular, text similarity module 1101 may compare the amount, date, and currency attributes of candidate data items predicted from the first frame with those of candidate data items predicted from the second frame. If there is a match between these attributes, the objects in the two distinct frames may be deemed the same object. As a result, candidate data items predicted from the second frame may be placed into the same priority queues as those predicted from the first frame. If there is no match between these attributes the objects in the two distinct frames may be deemed different objects. In this instance, candidate data items predicted from the second frame may be placed into different priority queues as those predicted from the first frame.

In some embodiments, there may be a match between some candidate data items and non-matches between other candidate data items predicted from the first and second frames. In this instance, those candidate data items deemed a match may be placed into the same priority queues whereas those candidate data items deemed a non-match may be placed into different priority queues.

Image similarity module 1102 is configured to perform image-based similarity on two or more frames to determine a score of similarity between them. If a similarity score is above a threshold, two distinct frames may be deemed a match. In this instance, candidate data items predicted from the second frame may be placed into the same priority queues. If, on the other hand, the similarity score is below a threshold, then the two distinct frames may be deemed a non-match. In this instance, candidate data items predicted from the second frame may be placed into different priority queues as those predicted from the first frame.

In the example shown, first frame 1103 is processed prior to second frame 1105. First frame 1103 includes an object with text data items related to "Muffin" and "Coffee." As a result of processing first frame 1103, consolidation engine 120 is shown to include priority queue 1108 for a candidate data item 1114 associated with "Coffee" and priority queue 1110 for a candidate data item 1116 associated with "Muffin." Second frame 1105 is shown to include the same real world object as first frame 1103. However, second frame 1105 captures the object from a different perspective and thus captures different content. For example, second frame 1105 also includes the text data item associated with "Coffee" but does not include the text data item associated with "Muffin." Second frame 1105 is also shown to include text data item associated with "Pasta," which was not captured in first frame 1103.

As shown, candidate data item 1104 associated with "Coffee" and candidate data item 1106 associated with "Pasta" are predicted from the text data items of second frame 1105. Consolidation engine 120 is configured to determine whether to place candidate data items 1104 and 1106 into priority queues 1108 and 1110 or whether to create a new priority queue for them. In particular, similarity engine 1100 is configured to employ text similarity module 1101 to determine whether there is a match between the OCR-generated text and attributes associated with candidate data items 1104 and 1106 and those associated with candidate data items 1114 and 1116. Further similarity engine 1100 is configured to employ image similarity module 1102 to determine whether there is a match between first frame 1103 and second frame 1105.

As shown, similarity engine 1100 determines that candidate data item 1104 is to be placed in priority queue 1108 and that candidate data item 1106 is to be placed in new priority queue 1112. For example, text similarity module 1101 may determine that there is a match between the OCR-generated text associated with candidate data item 1104 and that associated with candidate data item 1114. Further, text similarity module 1101 may determine a match between attributes of candidate data item 1104 and those of candidate data item 1114 (e.g., that the amount attributes of "5.55" match between candidate data items 1104 and 1114). As a result, candidate data item 1104 may be placed in priority queue 1108. On the other hand, text similarity module 1101 may determine a non-match between OCR-generated text associated with candidate data item 1106 and those of candidate data items 1114 and 1116. As a result, candidate data item 1106 is not placed in priority queues 1108 or 1110. Instead, a new priority queue 1112 may be created for candidate data item 1106.

Figure 12:
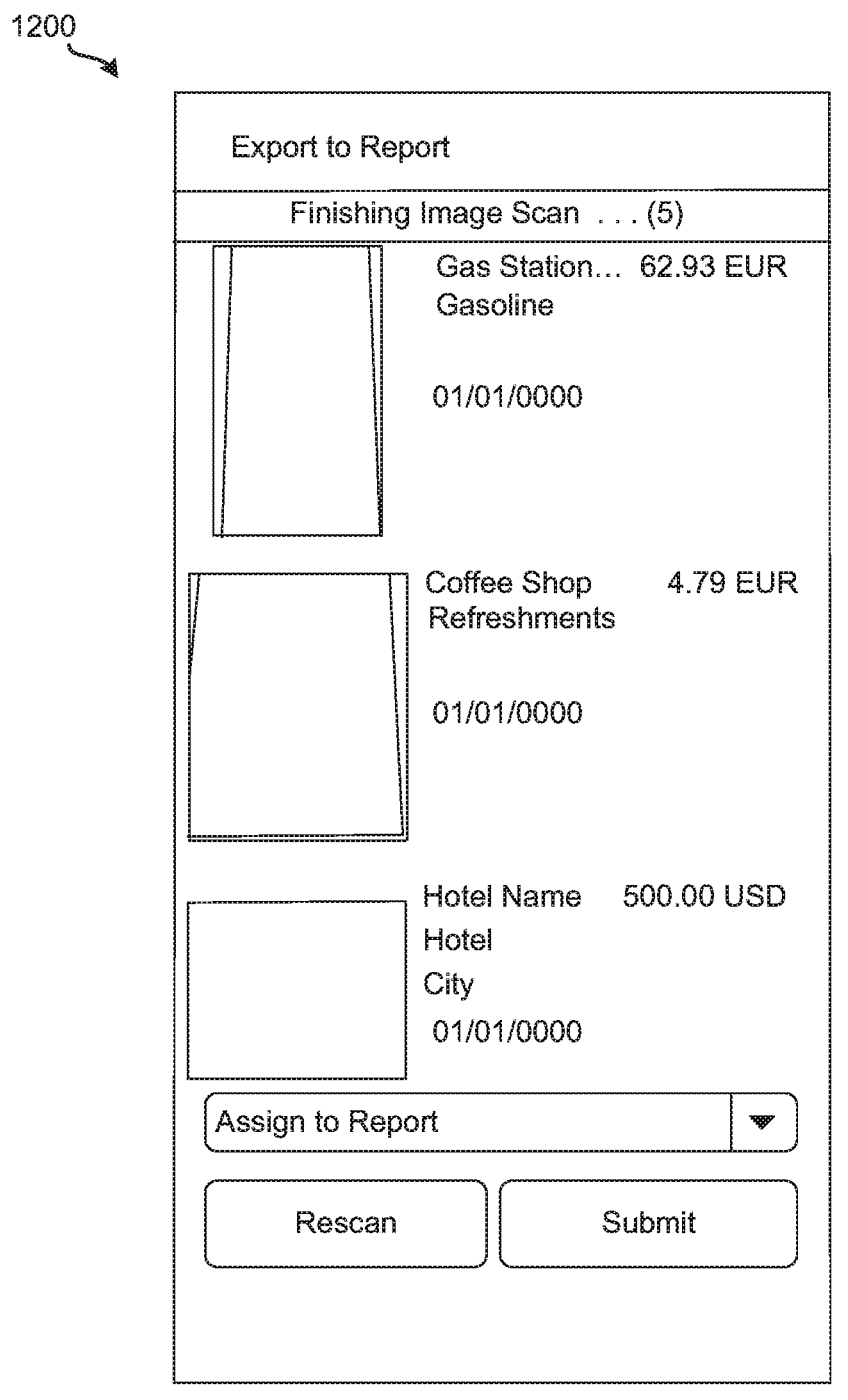

FIG. 12 shows an example of a user interface and certain exemplary features, according to one embodiment. User interface 1200 may be user interface 124 of mobile device 100, for example. User interface 1200 may be configured to enable a user to interact with data items predicted from real world objects. In the example shown, user interface 1200 is shown to display data items predicted from three objects. In a first data item, a gasoline expense is shown along with a frame capturing the object where the first data item was predicted. The first data item is shown to include attributes such as a vendor name of "Gas Station," an amount of "62.93," a currency of "EUR," an expense type of "Gasoline," and date of "01/01/0000."

In a second data item, a distinct expense is shown. The second data item is shown to include attributes such as a vendor name of "Coffee Shop," an amount of "4.79," a currency of "EUR," an expense type of "Refreshments," and a date of "01/01/000." In a third data item, another distinct expense is shown. The third data item is shown to include attributes such as a vendor name of "Hotel Name," an amount of "500.00," a currency of "USD," an expense type of "Hotel," a location of "City Name," and a date of "01/01/0000."

User interface 1200 is also shown to include a "Rescan" button, a "Submit" button, and an "Assign to Report" element. A user may be enabled to process certain objects again by selecting the "Rescan." The user may be enabled to assign the first, second, and third data items to various expense reports by using the "Assign to Report" element. Once the user is satisfied with the predicted data items as displayed in user interface 1200 and the reports to which they are assigned, they may submit the data items for reporting by selecting the "Submit" button.

Figure 13:
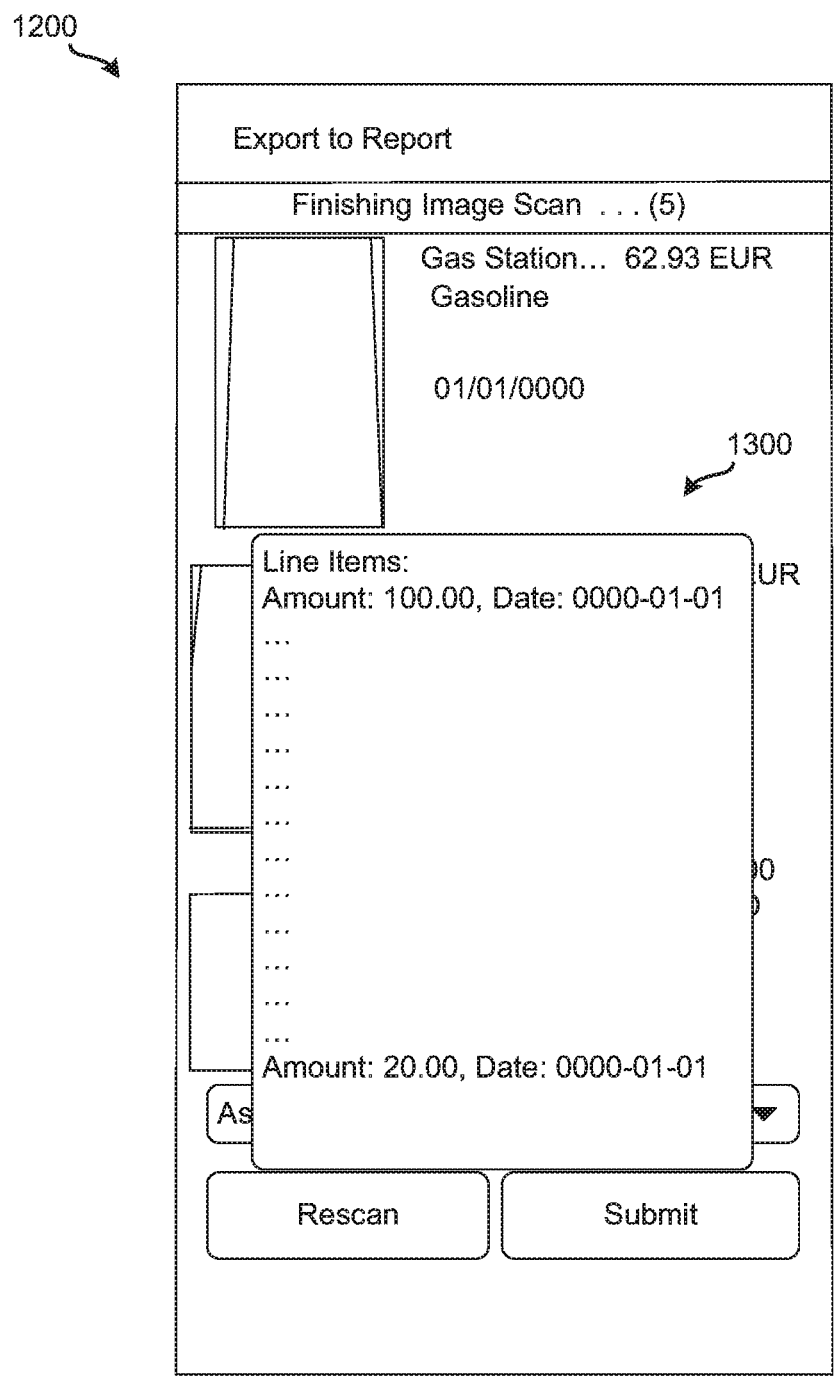
FIG. 13 shows additional features of the user interface, according to one embodiment.

FIG. 13 shows additional exemplary features of user interface 1200, according to one embodiment. In the example shown, user interface 1200 is shown to display an overlay window 1300 including various line items from one or all of the first, second, and third data items. The user may use overlay window 1300 to further verify the accuracy of the first, second, and third data items with finer granularity.

Figure 14:
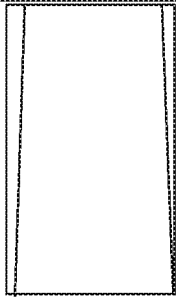
FIG. 14 shows additional features of the user interface, according to one embodiment.

FIG. 14 shows additional exemplary features of user interface 1200, according to one embodiment. In the example shown, the user may have selected the "Assign to Report" element. In response, user interface 1200 displays a drop down menu 1400 that includes a list of expense reports (e.g., Expense Reports 1-4) to which the first, second, and third data items are assignable. If the user does not see a suitable expense report in drop down menu 1400, the user may be enabled to create a new expense report to which the first, second, and third data items are assigned.

Figure 15:
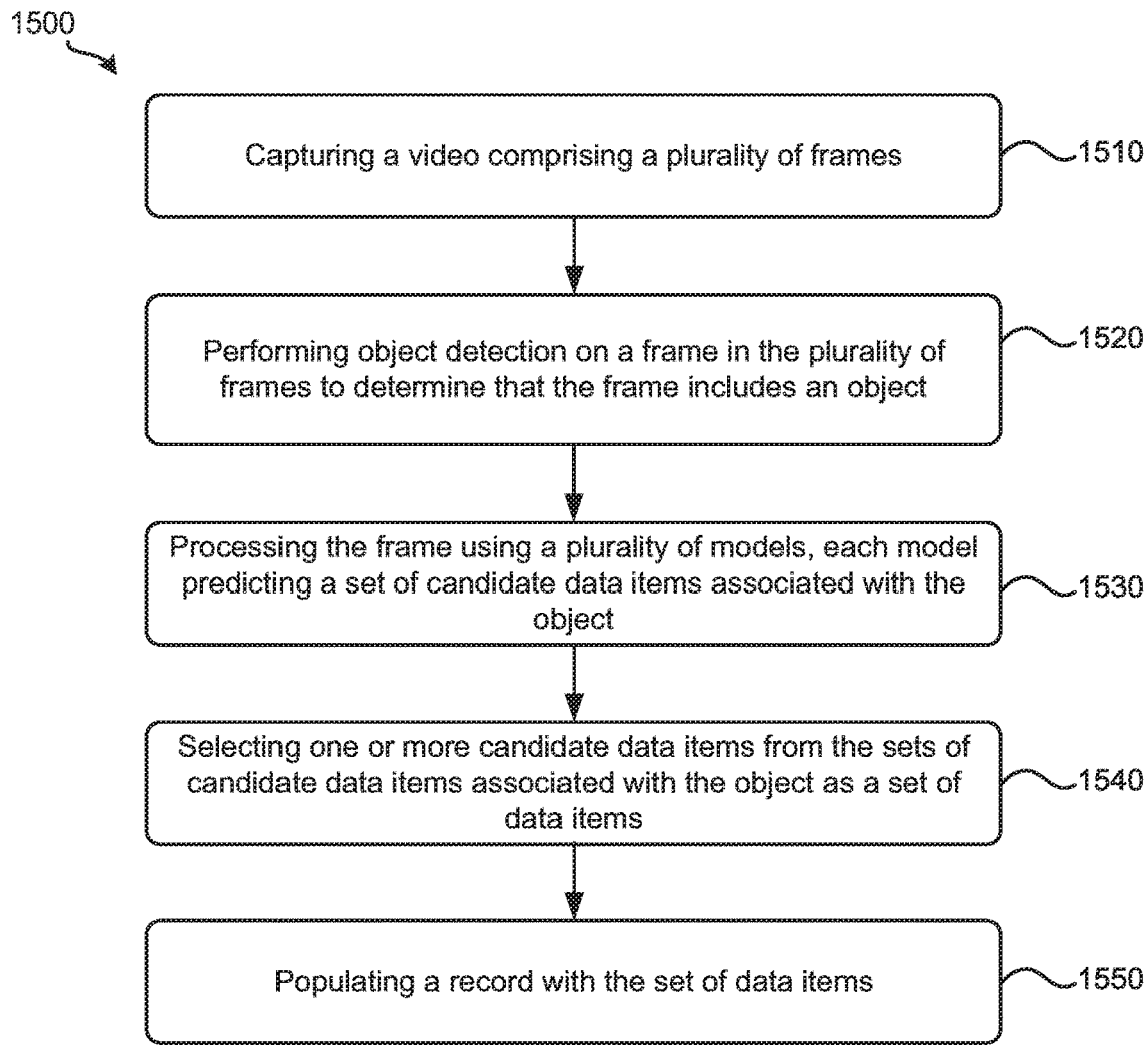
FIG. 15 illustrates a process for predicting candidate data items from a real-world object, according to some embodiments.

FIG. 15 illustrates process 1500 for predicting candidate data items from a real-world object, according to some embodiments. In some embodiments, mobile device 100 performs process 1500. Process 1500 begins by capturing, at 1510, a video comprising a plurality of frames. Referring to FIG. 1 as an example, video capture device 102 may capture a plurality of frames of object 101. Object 101 may be a receipt with multiple line items. Video capture device 102 may store the plurality of frames in image store 104 as frames 106. The plurality of frames may be stored as a single file (e.g., a video file).

Next, process 1500 performs, at 1520, object detection on a frame in the plurality of frames to determine that the frame includes an object. Referring to FIG. 1 as an example, once frames 106 are available in image store 104, object detector 108 may retrieve a frame in frames 106 to perform object detection. As mentioned above, object detector 108 may determine whether a retrieved frame includes an object or not.

Process 1500 then processes, at 1530, the frame using a plurality of models, each model predicting a set of candidate data items associated with the object. Referring to FIG. 1 as an example, OCR ML model 110, text-to-token model 112, image-to-token model 114, and backend service 126 may process a frame determined by object detector 108 to include an object. In this example, text-to-token model 112 (together with OCR ML model 110), image-to-token model 114, and backend service 126 (together with OCR ML model 110) predict a set of candidate data items from the object. For example, each of the aforementioned models may predict a candidate data item from each of the multiple line items if the object is a receipt.

After operation 1530, process 1500 selects, at 1540, one or more candidate data items from the sets of candidate data items associated with the object as a set of data items. Referring to FIGS. 1 and 2 and an example, upon receiving candidate data items predicted by the text-to-token model 112, image-to-token model 114, and backend service 126, consolidation engine 120 may place the candidate data items into priority queues. Record manager 122 may then select candidate data items with the highest confidence score as the data items it populates record 216 with. In some embodiments, record manager 122 may select the one or more candidate data items according to their amount attribute's confidence scores. That is, record manager 122 may select a candidate data item from a priority queue if the candidate data item has an amount attribute with the highest confidence score out of all of the candidate data items in the priority queue.

Finally, process 1500 populates, at 1550, a record with the set of data items. Referring again to FIGS. 1 and 2, when record manager 122 selects the one or more candidate data items as the set of data items from their respective priority queues, it may then populate record 216 with those data items. For this example, record manager populates record 216 with data items 220, 222, 224 that it selected from priority queues 210-214, respectively.

Figure 16:
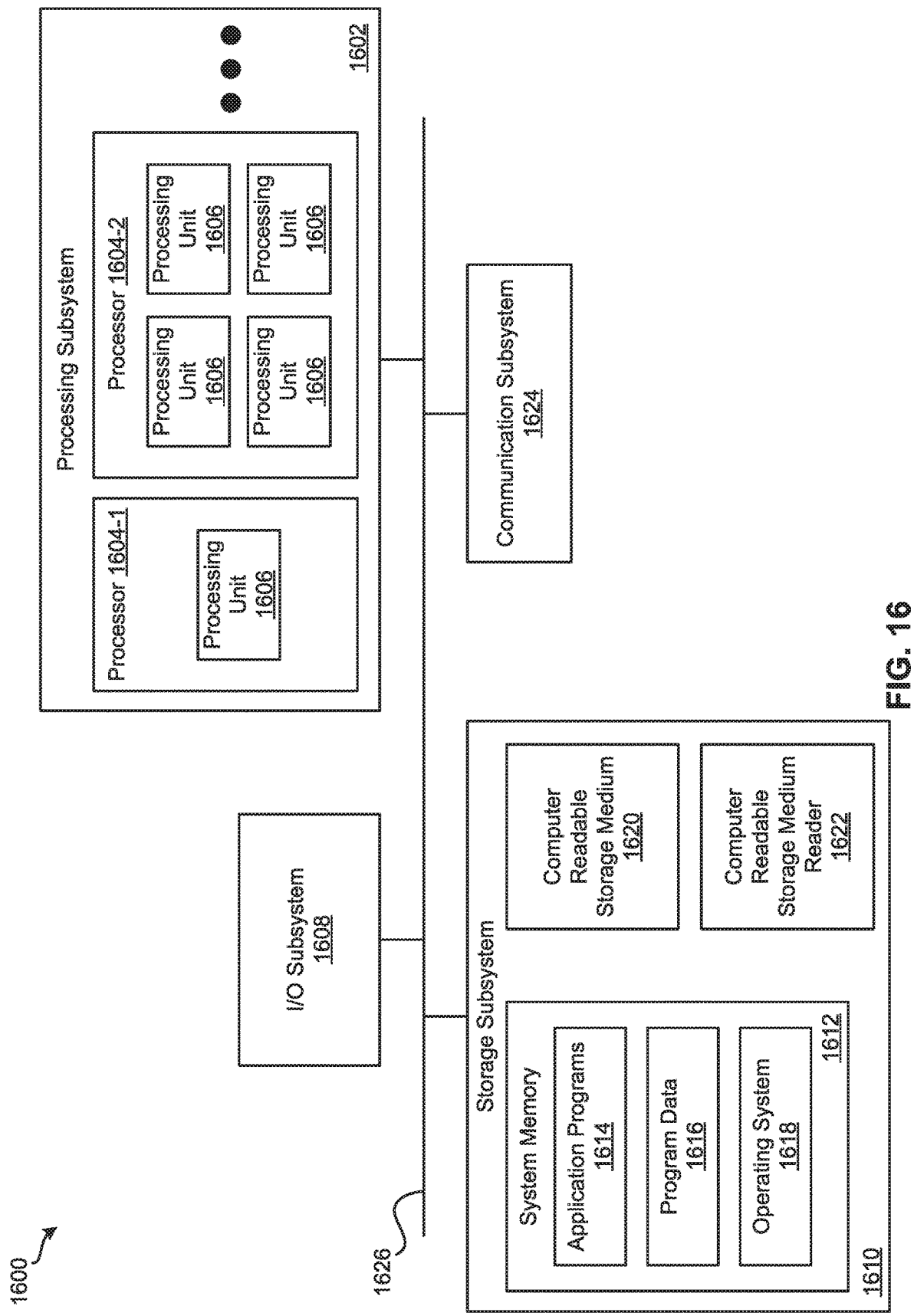
FIG. 16 illustrates an exemplary computer system, in which various embodiments may be implemented.

FIG. 16 illustrates an exemplary computer system 1600 for implementing various embodiments described above. For example, computer system 1600 may be used to implement systems mobile device 100 and computing device 118. Computer system 1600 may be a desktop computer, a laptop, a server computer, or any other type of computer system or combination thereof. Some or all elements of mobile device 100, object detector 108, OCR ML module 110, text-to-token model 112, image-to-token model 114, API client 116, computing device 118, consolidation engine 120, record manager 122, user interface 124, or backend service 126 or combinations thereof can be included or implemented in computer system 1600. In addition, computer system 1600 can implement many of the operations, methods, and/or processes described above (e.g., process 1500). As shown in FIG. 16, computer system 1600 includes processing subsystem 1602, which communicates, via bus subsystem 1626, with input/output (I/O) subsystem 1608, storage subsystem 1610 and communication subsystem 1624.

Bus subsystem 1626 is configured to facilitate communication among the various components and subsystems of computer system 1600. While bus subsystem 1626 is illustrated in FIG. 16 as a single bus, one of ordinary skill in the art will understand that bus subsystem 1626 may be implemented as multiple buses. Bus subsystem 1626 may be any of several types of bus structures (e.g., a memory bus or memory controller, a peripheral bus, a local bus, etc.) using any of a variety of bus architectures. Examples of bus architectures may include an Industry Standard Architecture (ISA) bus, a Micro Channel Architecture (MCA) bus, an Enhanced ISA (EISA) bus, a Video Electronics Standards Association (VESA) local bus, a Peripheral Component Interconnect (PCI) bus, a Universal Serial Bus (USB), etc.

Processing subsystem 1602, which can be implemented as one or more integrated circuits (e.g., a conventional microprocessor or microcontroller), controls the operation of computer system 1600. Processing subsystem 1602 may include one or more processors 1604. Each processor 1604 may include one processing unit 1606 (e.g., a single core processor such as processor 1604-1) or several processing units 1606 (e.g., a multicore processor such as processor 1604-2). In some embodiments, processors 1604 of processing subsystem 1602 may be implemented as independent processors while, in other embodiments, processors 1604 of processing subsystem 1602 may be implemented as multiple processors integrate into a single chip or multiple chips. Still, in some embodiments, processors 1604 of processing subsystem 1602 may be implemented as a combination of independent processors and multiple processors integrated into a single chip or multiple chips.

In some embodiments, processing subsystem 1602 can execute a variety of programs or processes in response to program code and can maintain multiple concurrently executing programs or processes. At any given time, some or all of the program code to be executed can reside in processing subsystem 1602 and/or in storage subsystem 1610. Through suitable programming, processing subsystem 1602 can provide various functionalities, such as the functionalities described above by reference to process 1500, etc.

I/O subsystem 1608 may include any number of user interface input devices and/or user interface output devices. User interface input devices may include a keyboard, pointing devices (e.g., a mouse, a trackball, etc.), a touchpad, a touch screen incorporated into a display, a scroll wheel, a click wheel, a dial, a button, a switch, a keypad, audio input devices with voice recognition systems, microphones, image/video capture devices (e.g., webcams, image scanners, barcode readers, etc.), motion sensing devices, gesture recognition devices, eye gesture (e.g., blinking) recognition devices, biometric input devices, and/or any other types of input devices.

User interface output devices may include visual output devices (e.g., a display subsystem, indicator lights, etc.), audio output devices (e.g., speakers, headphones, etc.), etc. Examples of a display subsystem may include a cathode ray tube (CRT), a flat-panel device (e.g., a liquid crystal display (LCD), a plasma display, etc.), a projection device, a touch screen, and/or any other types of devices and mechanisms for outputting information from computer system 1600 to a user or another device (e.g., a printer).

As illustrated in FIG. 16, storage subsystem 1610 includes system memory 1612, computer-readable storage medium 1620, and computer-readable storage medium reader 1622. System memory 1612 may be configured to store software in the form of program instructions that are loadable and executable by processing subsystem 1602 as well as data generated during the execution of program instructions. In some embodiments, system memory 1612 may include volatile memory (e.g., random access memory (RAM)) and/or non-volatile memory (e.g., read-only memory (ROM), programmable read-only memory (PROM), erasable programmable read-only memory (EPROM), electrically erasable programmable read-only memory (EEPROM), flash memory, etc.). System memory 1612 may include different types of memory, such as static random access memory (SRAM) and/or dynamic random access memory (DRAM). System memory 1612 may include a basic input/output system (BIOS), in some embodiments, that is configured to store basic routines to facilitate transferring information between elements within computer system 1600 (e.g., during start-up). Such a BIOS may be stored in ROM (e.g., a ROM chip), flash memory, or any other type of memory that may be configured to store the BIOS.

As shown in FIG. 16, system memory 1612 includes application programs 1614 (e.g., client application 110a-n), program data 1616, and operating system (OS) 1618. OS 1618 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome® OS, and the like) and/or mobile operating systems such as Apple iOS, Windows Phone, Windows Mobile, Android, BlackBerry OS, Blackberry 10, and Palm OS, WebOS operating systems.

Computer-readable storage medium 1620 may be a non-transitory computer-readable medium configured to store software (e.g., programs, code modules, data constructs, instructions, etc.). Many of the components (e.g., object detector 108, OCR ML module 110, text-to-token model 112, image-to-token model 114, API client 116, computing device 118, consolidation engine 120, record manager 122, user interface 124, or backend service 126) and/or processes (e.g., process 1500) described above may be implemented as software that when executed by a processor or processing unit (e.g., a processor or processing unit of processing subsystem 1602) performs the operations of such components and/or processes. Storage subsystem 1610 may also store data used for, or generated during, the execution of the software.

Storage subsystem 1610 may also include computer-readable storage medium reader 1622 that is configured to communicate with computer-readable storage medium 1620. Together and, optionally, in combination with system memory 1612, computer-readable storage medium 1620 may comprehensively represent remote, local, fixed, and/or removable storage devices plus storage media for temporarily and/or more permanently containing, storing, transmitting, and retrieving computer-readable information.

Computer-readable storage medium 1620 may be any appropriate media known or used in the art, including storage media such as volatile, non-volatile, removable, non-removable media implemented in any method or technology for storage and/or transmission of information. Examples of such storage media includes RAM, ROM, EEPROM, flash memory or other memory technology, compact disc read-only memory (CD-ROM), digital versatile disk (DVD), Blu-ray Disc (BD), magnetic cassettes, magnetic tape, magnetic disk storage (e.g., hard disk drives), Zip drives, solid-state drives (SSD), flash memory card (e.g., secure digital (SD) cards, CompactFlash cards, etc.), USB flash drives, or any other type of computer-readable storage media or device.

Communication subsystem 1624 serves as an interface for receiving data from, and transmitting data to, other devices, computer systems, and networks. For example, communication subsystem 1624 may allow computer system 1600 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication subsystem 1624 can include any number of different communication components. Examples of such components may include radio frequency (RF) transceiver components for accessing wireless voice and/or data networks (e.g., using cellular technologies such as 2G, 3G, 4G, 16G, etc., wireless data technologies such as Wi-Fi, Bluetooth, ZigBee, etc., or any combination thereof), global positioning system (GPS) receiver components, and/or other components. In some embodiments, communication subsystem 1624 may provide components configured for wired communication (e.g., Ethernet) in addition to or instead of components configured for wireless communication.

One of ordinary skill in the art will realize that the architecture shown in FIG. 16 is only an example architecture of computer system 1600, and that computer system 1600 may have additional or fewer components than shown, or a different configuration of components. The various components shown in FIG. 16 may be implemented in hardware, software, firmware or any combination thereof, including one or more signal processing and/or application specific integrated circuits.

Figure 17:
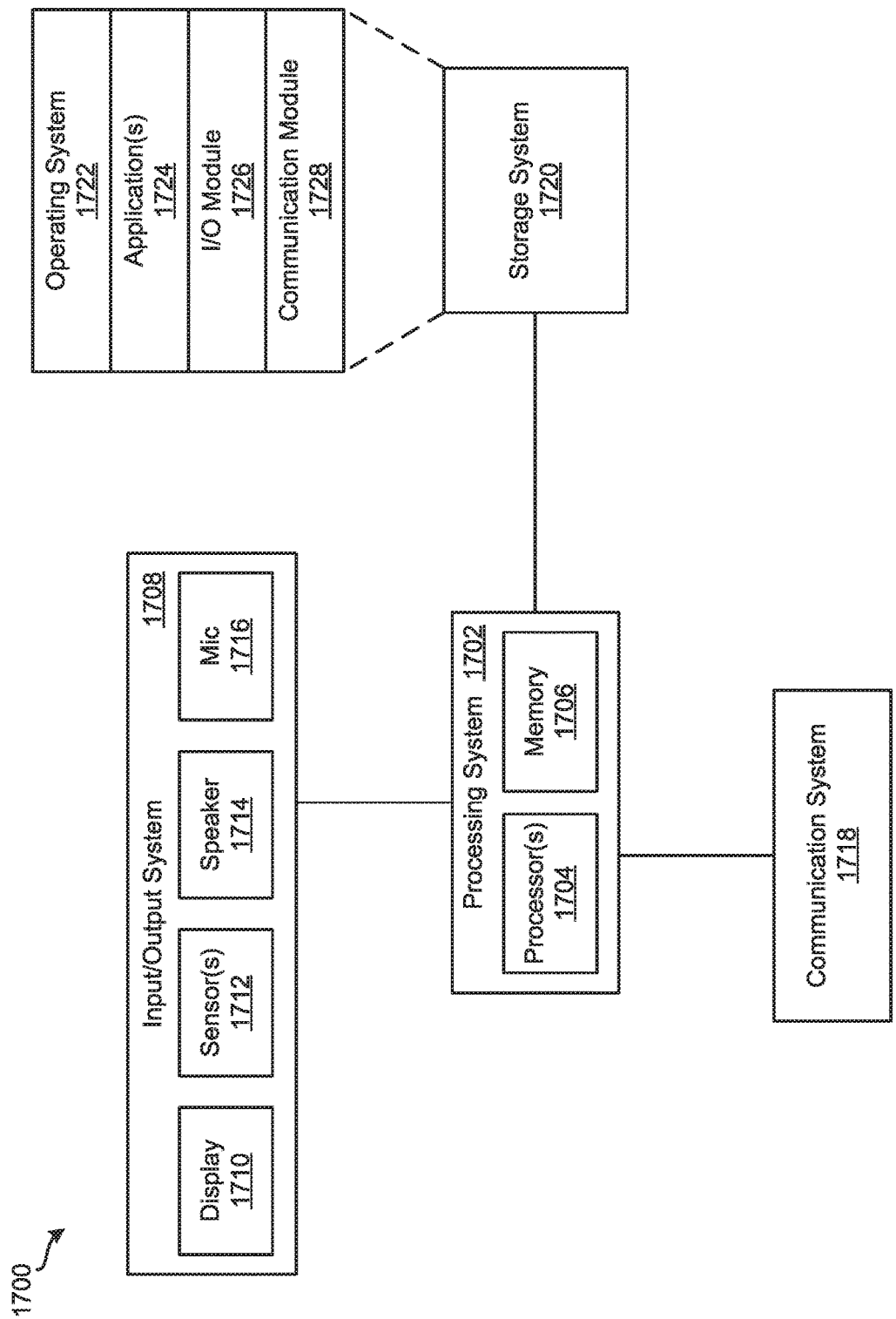
FIG. 17 illustrates an exemplary computing device, in which various embodiments may be implemented.

FIG. 17 illustrates an exemplary computing device 1700 for implementing various embodiments described above. For example, computing device 1700 may be used to implement mobile device 100. Computing device 1700 may be a cellphone, a smartphone, a wearable device, an activity tracker or manager, a tablet, a personal digital assistant (PDA), a media player, or any other type of mobile computing device or combination thereof. Some or all elements of mobile device 100 can be included or implemented in computing device 1700. As shown in FIG. 17, computing device 1700 includes processing system 1702, input/output (I/O) system 1708, communication system 1718, and storage system 1720. These components may be coupled by one or more communication buses or signal lines.

Processing system 1702, which can be implemented as one or more integrated circuits (e.g., a conventional microprocessor or microcontroller), controls the operation of computing device 1700. As shown, processing system 1702 includes one or more processors 1704 and memory 1706. Processors 1704 are configured to run or execute various software and/or sets of instructions stored in memory 1706 to perform various functions for computing device 1700 and to process data.

Each processor of processors 1704 may include one processing unit (e.g., a single core processor) or several processing units (e.g., a multicore processor). In some embodiments, processors 1704 of processing system 1702 may be implemented as independent processors while, in other embodiments, processors 1704 of processing system 1702 may be implemented as multiple processors integrate into a single chip. Still, in some embodiments, processors 1704 of processing system 1702 may be implemented as a combination of independent processors and multiple processors integrated into a single chip.

Memory 1706 may be configured to receive and store software (e.g., operating system 1722, applications 1724, I/O module 1726, communication module 1728, etc. from storage system 1720) in the form of program instructions that are loadable and executable by processors 1704 as well as data generated during the execution of program instructions. In some embodiments, memory 1706 may include volatile memory (e.g., random access memory (RAM)), non-volatile memory (e.g., read-only memory (ROM), programmable read-only memory (PROM), erasable programmable read-only memory (EPROM), electrically erasable programmable read-only memory (EEPROM), flash memory, etc.), or a combination thereof.

I/O system 1708 is responsible for receiving input through various components and providing output through various components. As shown for this example, I/O system 1708 includes display 1710, one or more sensors 1712, speaker 1714, and microphone 1716. Display 1710 is configured to output visual information (e.g., a graphical user interface (GUI) generated and/or rendered by processors 1704). In some embodiments, display 1710 is a touch screen that is configured to also receive touch-based input. Display 1710 may be implemented using liquid crystal display (LCD) technology, light-emitting diode (LED) technology, organic LED (OLED) technology, organic electro luminescence (OEL) technology, or any other type of display technologies. Sensors 1712 may include any number of different types of sensors for measuring a physical quantity (e.g., temperature, force, pressure, acceleration, orientation, light, radiation, etc.). Speaker 1714 is configured to output audio information and microphone 1716 is configured to receive audio input. One of ordinary skill in the art will appreciate that I/O system 1708 may include any number of additional, fewer, and/or different components. For instance, I/O system 1708 may include a keypad or keyboard for receiving input, a port for transmitting data, receiving data and/or power, and/or communicating with another device or component, an image capture component for capturing photos and/or videos, etc.

Communication system 1718 serves as an interface for receiving data from, and transmitting data to, other devices, computer systems, and networks. For example, communication system 1718 may allow computing device 1700 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication system 1718 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication system 1718 may provide components configured for wired communication (e.g., Ethernet) in addition to or instead of components configured for wireless communication.

Storage system 620 handles the storage and management of data for computing device 600. Storage system 620 may be implemented by one or more non-transitory machine-readable mediums that are configured to store software (e.g., programs, code modules, data constructs, instructions, etc.) and store data used for, or generated during, the execution of the software. Many of the components (e.g., object detector 108, OCR ML module 110, text-to-token model 112, image-to-token model 114, API client 116, computing device 118, consolidation engine 120, record manager 122, user interface 124, or backend service 126) described above may be implemented as software that when executed by a processor or processing unit (e.g., processors 1704 of processing system 1702) performs the operations of such components and/or processes.

In this example, storage system 1720 includes operating system 1722, one or more applications 1724, I/O module 1726, and communication module 1728. Operating system 1722 includes various procedures, sets of instructions, software components and/or drivers for controlling and managing general system tasks (e.g., memory management, storage device control, power management, etc.) and facilitates communication between various hardware and software components. Operating system 1722 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome® OS, and the like) and/or mobile operating systems such as Apple iOS, Windows Phone, Windows Mobile, Android, BlackBerry OS, Blackberry 10, and Palm OS, WebOS operating systems.

Applications 1724 can include any number of different applications installed on computing device 1700. Other examples of such applications may include a browser application, an address book application, a contact list application, an email application, an instant messaging application, a word processing application, JAVA-enabled applications, an encryption application, a digital rights management application, a voice recognition application, location determination application, a mapping application, a music player application, etc.

I/O module 1726 manages information received via input components (e.g., display 1710, sensors 1712, and microphone 1716) and information to be outputted via output components (e.g., display 1710 and speaker 1714). Communication module 1728 facilitates communication with other devices via communication system 1718 and includes various software components for handling data received from communication system 1718.

One of ordinary skill in the art will realize that the architecture shown in FIG. 17 is only an example architecture of computing device 1700, and that computing device 1700 may have additional or fewer components than shown, or a different configuration of components. The various components shown in FIG. 17 may be implemented in hardware, software, firmware or any combination thereof, including one or more signal processing and/or application specific integrated circuits.

Figure 18:
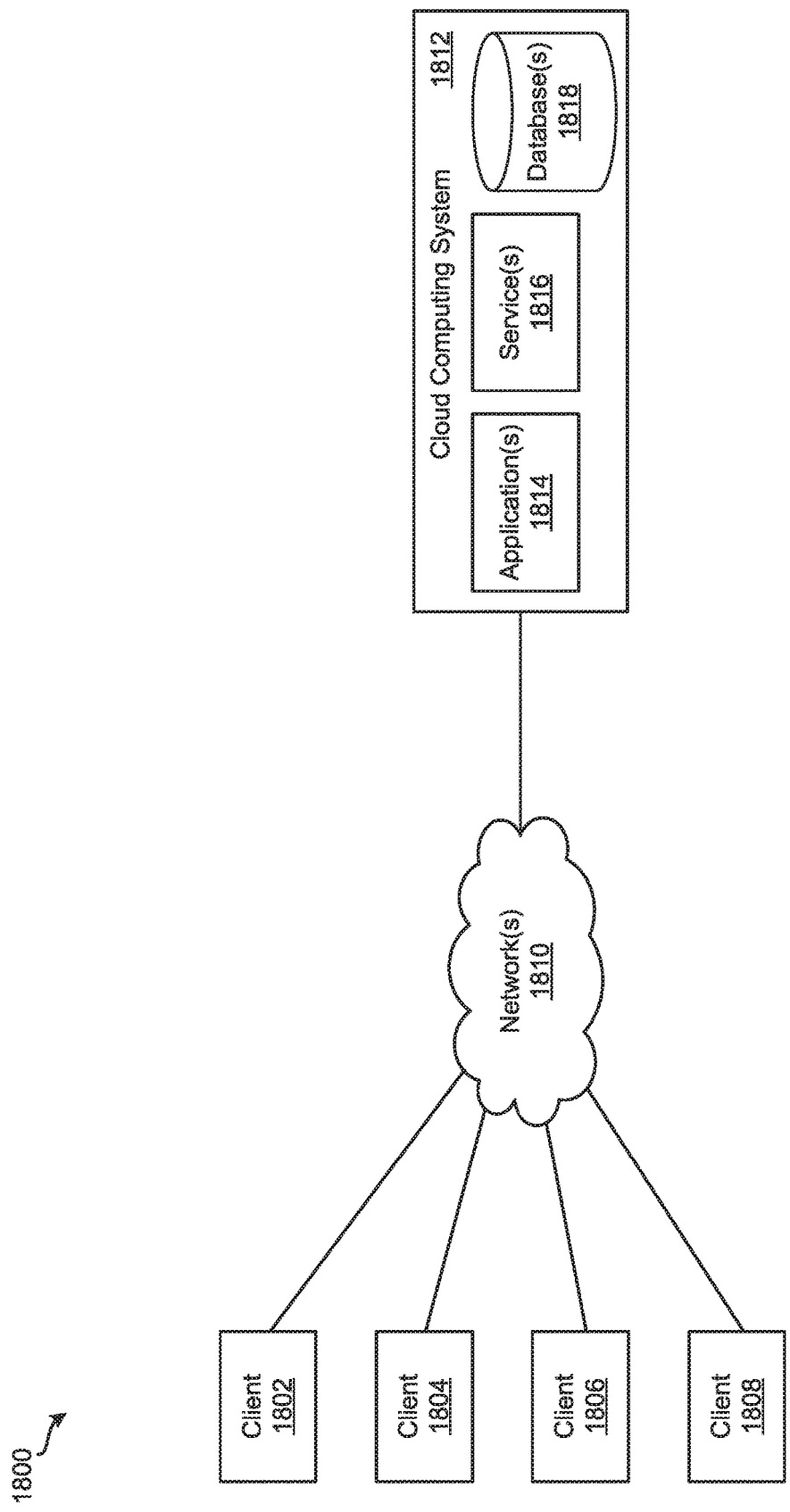
FIG. 18 illustrates an exemplary system, in which various embodiments may be implemented.

FIG. 18 illustrates an exemplary system 1800 for implementing various embodiments described above. For example, cloud computing system 1812 may be used to implement computing device 118 and client devices 1802-1808 may be used to implement mobile device 100. As shown, system 1800 includes client devices 1802-1808, one or more networks 1810, and cloud computing system 1812. Cloud computing system 1812 is configured to provide resources and data to client devices 1802-1808 via networks 1810. In some embodiments, cloud computing system 1812 provides resources to any number of different users (e.g., customers, tenants, organizations, etc.). Cloud computing system 1812 may be implemented by one or more computer systems (e.g., servers), virtual machines operating on a computer system, or a combination thereof.

As shown, cloud computing system 1812 includes one or more applications 1814, one or more services 1816, and one or more databases 1818. Cloud computing system 1812 may provide applications 1814, services 1816, and databases 1818 to any number of different customers in a self-service, subscription-based, elastically scalable, reliable, highly available, and secure manner.

In some embodiments, cloud computing system 1812 may be adapted to automatically provision, manage, and track a customer's subscriptions to services offered by cloud computing system 1812. Cloud computing system 1812 may provide cloud services via different deployment models. For example, cloud services may be provided under a public cloud model in which cloud computing system 1812 is owned by an organization selling cloud services and the cloud services are made available to the general public or different industry enterprises. As another example, cloud services may be provided under a private cloud model in which cloud computing system 1812 is operated solely for a single organization and may provide cloud services for one or more entities within the organization. The cloud services may also be provided under a community cloud model in which cloud computing system 1812 and the cloud services provided by cloud computing system 1812 are shared by several organizations in a related community. The cloud services may also be provided under a hybrid cloud model, which is a combination of two or more of the aforementioned different models.

In some instances, any one of applications 1814, services 1816, and databases 1818 made available to client devices 1802-1808 via networks 1810 from cloud computing system 1800 is referred to as a "cloud service." Typically, servers and systems that make up cloud computing system 1800 are different from the on-premises servers and systems of a customer. For example, cloud computing system 1800 may host an application and a user of one of client devices 1802-1808 may order and use the application via networks 1810.

Applications 1814 may include software applications that are configured to execute on cloud computing system 1812 (e.g., a computer system or a virtual machine operating on a computer system) and be accessed, controlled, managed, etc. via client devices 1802-1808. In some embodiments, applications 1814 may include server applications and/or mid-tier applications (e.g., HTTP (hypertext transport protocol) server applications, FTP (file transfer protocol) server applications, CGI (common gateway interface) server applications, JAVA server applications, etc.). Services 1816 are software components, modules, application, etc. that are configured to execute on cloud computing system 1812 and provide functionalities to client devices 1802-1808 via networks 1810. Services 1816 may be web-based services or on-demand cloud services.

Databases 1818 are configured to store and/or manage data that is accessed by applications 1814, services 1816, and/or client devices 1802-1808. Databases 1818 may reside on a non-transitory storage medium local to (and/or resident in) cloud computing system 1812, in a storage-area network (SAN), on a non-transitory storage medium local located remotely from cloud computing system 1812. In some embodiments, databases 1818 may include relational databases that are managed by a relational database management system (RDBMS). Databases 1818 may be a column-oriented databases, row-oriented databases, or a combination thereof. In some embodiments, some or all of databases 1818 are in-memory databases. That is, in some such embodiments, data for databases 1818 are stored and managed in memory (e.g., random access memory (RAM)).

Client devices 1802-1808 are configured to execute and operate a client application (e.g., a web browser, a proprietary client application, etc.) that communicates with applications 1814, services 1816, and/or databases 1818 via networks 1810. This way, client devices 1802-1808 may access the various functionalities provided by applications 1814, services 1816, and databases 1818 while applications 1814, services 1816, and databases 1818 are operating (e.g., hosted) on cloud computing system 1800. Client devices 1802-1808 may be computer system 1600 or computing device 1700, as described above by reference to FIGS. 16 and 17, respectively. Although system 1800 is shown with four client devices, any number of client devices may be supported.

Networks 1810 may be any type of network configured to facilitate data communications among client devices 1802-1808 and cloud computing system 1812 using any of a variety of network protocols. Networks 1810 may be a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.

The above description illustrates various embodiments of the present disclosure along with examples of how aspects of the present disclosure may be implemented. The above examples and embodiments should not be deemed to be the only embodiments, and are presented to illustrate the flexibility and advantages of various embodiments of the present disclosure as defined by the following claims. Based on the above disclosure and the following claims, other arrangements, embodiments, implementations and equivalents will be evident to those skilled in the art and may be employed without departing from the spirit and scope of the present disclosure as defined by the claims.

What is claimed is:

1. A method comprising:
    capturing, by an image capture device, a video comprising a plurality of frames;
    performing, by an object detector, object detection on a frame in the plurality of frames to determine that the frame includes an object, wherein a first model in the plurality of models is configured to predict characters from images and wherein a second model in the plurality of models is configured to predict characters from machine generated text, wherein processing the frame comprises:
        processing the frame using the first model to predict a first candidate data item from a first text data item in the object,
        processing the frame using an optical character recognition (OCR) machine learning model to generate text, and
    processing the generated text using the second model to predict a second candidate data item from the first text data item in the object;
    processing the frame using a plurality of models, wherein each model in the plurality of models is configured to predict a set of candidate data items from a set of text data items included in the object;
    selecting one or more candidate data items from the sets of candidate data items predicted from the set of text data items in the object as a set of data items included in the object, wherein selecting the one or more candidate data items from the sets of candidate data items comprises selecting the first candidate data item or the second candidate data item as a first data item in the set of data items corresponding to the first text data item; and
    populating a record with the set of data items.

2. The method of claim 1, wherein said processing the frame further comprises:
    communicating at least a portion of the generated text to a computing device configured to process the portion of the generated text using a third model, the third model configured to predict characters from OCR-generated text; and
    receiving, from the computing device, a third candidate data item predicted from the first text data item according to the third model;

wherein said selecting further comprises selecting the first candidate data item, the second candidate data item, or the third candidate data item as the first data item corresponding to the first text data item.

3. The method of claim 2, where the first model generates a first confidence score associated with the first candidate data item, the second model generates a second confidence score associated with the second candidate data item, and the third model generates a third confidence score associated with the third candidate data item, wherein said selecting the first candidate data item, the second candidate data item, or the third candidate data item further comprises:
selecting the first candidate data item, the second candidate data item, or the third candidate data item based on which of the first confidence score, the second confidence score, and the third confidence score is highest.

4. The method of claim 1, wherein said processing the frame further comprises:
processing the frame using the first model to predict a fourth candidate data item from a second text data item in the object; and
processing the generated text using the second model to predict a fifth candidate data item from the second text data item;
wherein said selecting further comprises selecting the fourth candidate data item or the fifth candidate data item as a second data item in the set of data items corresponding to the second text data item.

5. The method of claim 1, wherein the object is a first object, wherein the frame is a first frame, wherein the set of text data items is a first set of text data items, the method further comprising:
performing, by the object detector, object detection on a second frame in the plurality of frames to determine that the second frame includes a second object;
processing the second frame using the plurality of models to predict sets of candidate data items from a second set of text data items included in the second object; and
determining if a subset of the sets of candidate data items predicted from the second set of text data items in the second object is similar to a subset of the sets of candidate data items predicted from the first set of text data items in the first object.

6. The method of claim 5 further comprising:
if the subset of the sets of candidate data items predicted from the second set of text data items in the second object is similar to the subset of the sets of candidate data items predicted from the first set of text data items in the first object, said selecting further comprises selecting one or more candidate data items from the sets of candidate data items predicted from the first set of text data items in the first object and the subset of the sets of candidate data items predicted from the second set of text data items in the second object as the set of data items.

7. The method of claim 5 further comprising:
if the subset of the sets of candidate data items predicted from the second set of text data items in the second object is not similar to the subset of the sets of candidate data items predicted from the first set of text data items in the first object, said selecting further comprises selecting one or more candidate data items from the sets of candidate data items predicted from the second set of text data items in the second object as an additional set of data items included in the object; and
populating the record with the additional set of data items.

8. The method of claim 5, wherein said determining if the subset of the sets of candidate data items predicted from the second set of text data items in the second object is similar to the subset of the sets of candidate data items predicted from the first set of text data items in the first object comprises:
converting the subset of the sets of candidate data items predicted from the first set of text data items in the first object into first vector representations;
converting the subset of the sets of candidate data items predicted from the second set of text data items in the second object into second vector representations; and
performing cosine similarity on the first vector representations and the second vector representations.

9. The method of claim 5, wherein said determining if the subset of the sets of candidate data items predicted from the second set of text data items in the second object is similar to the subset of the sets of candidate data items predicted from the first set of text data items in the first object comprises:
performing image similarity on the first frame and the second frame.

10. The method of claim 1, wherein a model in the plurality of models is trained using handwritten text data.

11. The method of claim 1, wherein a model in the plurality of models is configured to operate on a computing device, wherein processing the frame using the model comprises:
sending the set of text data items include in the object to the computing device for the computing device to process the set of text data items included in the object through the model; and
receiving the predicted set of candidate data items from the computing device.

12. A non-transitory machine-readable medium storing a program executable by at least one processing unit of a device, the program comprising sets of instructions for:
capturing, by an image capture device, a video comprising a plurality of frames;
performing, by an object detector, object detection on a frame in the plurality of frames to determine that the frame includes an object;
processing the frame using a plurality of models, wherein each model in the plurality of models is configured to predict a set of candidate data items from a set of text data items included in the object, wherein a first model in the plurality of models is configured to predict characters from images and wherein a second model in the plurality of models is configured to predict characters from machine generated text, wherein processing the frame comprises:
processing the frame using the first model to predict a first candidate data item from a first text data item in the object,
processing the frame using an optical character recognition (OCR) machine learning model to generate text, and
processing the generated text using the second model to predict a second candidate data item from the first text data item in the object;
selecting one or more candidate data items from the sets of candidate data items predicted from the set of text data items in the object as a set of data items included in the object wherein selecting the one or more candidate data items from the sets of candidate data items comprises selecting the first candidate data item or the second candidate data item as a first data item in the set of data items corresponding to the first text data item; and populating a record with the set of data items.

13. The non-transitory machine-readable medium of claim 12, wherein said processing the frame further comprises:

communicating at least a portion of the generated text to a computing device configured to process the portion of the generated text using a third model, the third model configured to predict characters from OCR-generated text; and receiving, from the computing device, a third candidate data item predicted from the first text data item according to the third model;

wherein said selecting further comprises selecting the first candidate data item, the second candidate data item, or the third candidate data item as the first data item corresponding to the first text data item.

14. The non-transitory machine-readable medium of claim 12, wherein the object is a first object, wherein the frame is a first frame, wherein the set of text data items is a first set of text data items, the program further comprising instructions for:

performing, by the object detector, object detection on a second frame in the plurality of frames to determine that the second frame includes a second object;

processing the second frame using the plurality of models to predict sets of candidate data items from a second set of text data items in the second object; and determining if a subset of the sets of candidate data items predicted from the second set of text data items in the second object is similar to a subset of the sets of candidate data items predicted from the first set of text data items in the first object.

15. The non-transitory machine-readable medium of claim 12, wherein a model in the plurality of models is trained using handwritten text data.

16. The non-transitory machine-readable medium of claim 12, wherein a model in the plurality of models is configured to operate on a computing device, wherein processing the frame using the model comprises:

sending the set of text data items include in the object to the computing device for the computing device to process the set of text data items included in the object through the model; and receiving the predicted set of candidate data items from the computing device.

17. A system comprising:

a set of processing units; and a non-transitory machine-readable medium storing instructions that when executed by at least one processing unit in the set of processing units cause the at least one processing unit to:

capture, by an image capture device, a video comprising a plurality of frames;

perform, by an object detector, object detection on a frame in the plurality of frames to determine that the frame includes an object;

process the frame using a plurality of models, wherein each model in the plurality of models is configured to predict a set of candidate data items from a set of text data items included in the object, wherein a first model in the plurality of models is configured to predict characters from images and wherein a second model in the plurality of models is configured to predict characters from machine generated text, wherein processing the frame comprises:

processing the frame using the first model to predict a first candidate data item from a first text data item in the object, processing the frame using an optical character recognition (OCR) machine learning model to generate text, and processing the generated text using the second model to predict a second candidate data item from the first text data item in the object;

select one or more candidate data items from the sets of candidate data items predicted from the set of text data items in the object as a set of data items included in the object wherein selecting the one or more candidate data items from the sets of candidate data items comprises selecting the first candidate data item or the second candidate data item as a first data item in the set of data items corresponding to the first text data item; and populate a record with the set of data items.

18. The system of claim 17, wherein the object is a first object, wherein the frame is a first frame, wherein the set of text data items is a first set of text data items, wherein the instructions further cause the at least one processing unit to:

perform, by the object detector, object detection on a second frame in the plurality of video frames to determine that the second frame includes a second object;

process the second frame using the plurality of models to predict sets of candidate data items from a second set of text data items in the second object; and determine if a subset of the sets of candidate data items predicted from the second set of text data items in the second object is similar to a subset of the sets of candidate data items predicted from the first set of text data items in the first object;

wherein if the subset of the sets of candidate data items predicted from the second set of text data items in the second object is similar to the subset of the sets of candidate data items predicted from the first set of text data items in the first object, said selecting further comprises selecting one or more candidate data items from the sets of candidate data items predicted from the first set of text data items in the first object and the subset of the sets of candidate data items predicted from the second set of text data items in the second object as the set of data items; and wherein if the subset of the sets of candidate data items predicted from the second set of text data items in the second object is not similar to the subset of the sets of candidate data items predicted from the first set of text data items in the first object, said selecting further comprises selecting one or more candidate data items from the sets of candidate data items predicted from the second set of text data items in the second object as an additional set of data items included in the object and populating the record with the additional set of data items.

19. The system of claim 17, wherein a model in the plurality of models is trained using handwritten text data.

20. The system of claim 17, wherein a model in the plurality of models is configured to operate on a computing device, wherein processing the frame using the model comprises:

sending the set of text data items include in the object to the computing device for the computing device to process the set of text data items included in the object through the model; and receiving the predicted set of candidate data items from the computing device.

* * * * *